United States Patent
Suzuki et al.

(10) Patent No.: US 6,771,637 B1
(45) Date of Patent: Aug. 3, 2004

(54) GATEWAY APPARATUS

(75) Inventors: Hiroko Suzuki, Kawasaki (JP); Kazuyuki Ohtsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/438,653

(22) Filed: Nov. 12, 1999

(30) Foreign Application Priority Data

Feb. 16, 1999 (JP) ............................. 11-037237

(51) Int. Cl.$^7$ ................... H04L 12/66; H04L 12/28
(52) U.S. Cl. .................. 370/352; 370/401; 370/522; 379/900
(58) Field of Search .................. 370/230, 235, 370/229, 352, 353, 354, 355, 356, 401, 465, 410, 904, 522, 402, 351, 259–262; 379/900, 88.17; 709/223–230

(56) References Cited

U.S. PATENT DOCUMENTS 4,879,714 A * 11/1989 Maeno ...................... 370/437
6,078,582 A * 6/2000 Curry et al. ................ 370/356
6,233,223 B1 * 5/2001 Sabry et al. ................ 370/230
6,259,691 B1 * 7/2001 Naudus ...................... 370/352
6,463,053 B1 * 10/2002 Chen ......................... 370/352

FOREIGN PATENT DOCUMENTS

JP    10-173696    6/1998

* cited by examiner

Primary Examiner—Steven H. D Nguyen
(74) Attorney, Agent, or Firm—Katten Muchin Zavis Rosenman

(57) ABSTRACT

This invention is a gateway apparatus arranged between a circuit switched network and the Internet. The gateway apparatus comprises a prior connection section setting a channel on the Internet according to the call setting request received from the circuit switched network before the call setting request is received from the circuit switched network, and a call setting section setting a connection corresponding to the call setting request on the Internet by using the channel set by the prior connection section when the call setting request is received from the circuit switched network.

14 Claims, 13 Drawing Sheets

FIG. 3

(A) CHANNEL COUNT MANAGEMENT TABLE 69

| PATH NUMBER | | TRAFFIC STATE | CHANNEL COUNT |
|---|---|---|---|
| 2 | Q.931 CHANNEL CONNECTION COUNT | Q.931 CHANNEL CONNECTION COUNT (LOW) | 1 |
| | | Q.931 CHANNEL CONNECTION COUNT (NOMAL (INITIAL STATE)) | 2 |
| | | Q.931 CHANNEL CONNECTION COUNT (HIGH) | 3 |
| | H.245 CHANNEL CONNECTION COUNT | H.245 CHANNEL CONNECTION COUNT (LOW) | 0 |
| | | H.245 CHANNEL CONNECTION COUNT (NOMAL (INITIAL STATE)) | 1 |
| | | H.245 CHANNEL CONNECTION COUNT (HIGH) | 2 |
| | SOUND CHANNEL CONNECTION COUNT | SOUND CHANNEL CONNECTION COUNT (LOW) | 0 |
| | | SOUND CHANNEL CONNECTION COUNT (NOMAL (INITIAL STATE)) | 0 |
| | | SOUND CHANNEL CONNECTION COUNT (HIGH) | 1 |
| 3 | Q.931 CHANNEL CONNECTION COUNT | | |
| | H.245 CHANNEL CONNECTION COUNT | | |
| | SOUND CHANNEL CONNECTION COUNT | | |
| 4 | Q.931 CHANNEL CONNECTION COUNT | | |
| | H.245 CHANNEL CONNECTION COUNT | | |
| | SOUND CHANNEL CONNECTION COUNT | | |

(B) 69

| PATH NUMBER | Q.931 CHANNEL CONNECTION COUNT | H.245 CHANNEL CONNECTION COUNT | SOUND CHANNEL CONNECTION COUNT |
|---|---|---|---|
| 2 | 3 | 2 | 1 |
| 3 | 2 | 1 | 0 |
| 4 | 1 | 0 | 0 |

FIG. 4

70 CHANNEL NUMBER MANAGEMENT TABLE

| PATH NUMBER | Q.931 CHANNEL | | H.245 CHANNEL | | SOUND CHANNEL | |
|---|---|---|---|---|---|---|
| | CHANNEL NUMBER | OPEN/BUSY STATE | CHANNEL NUMBER | OPEN/BUSY STATE | CHANNEL NUMBER | OPEN/BUSY STATE |
| 2 | 2q1 | 0 | 2h1 | 0 | 2v1 | 0 |
| | 2q2 | 0 | 2h2 | 0 | | |
| | 2q3 | 0 | | | | |
| 3 | 3q1 | 0 | 3h1 | 0 | | |
| | 3q2 | 0 | | | | |
| 4 | 4q1 | 0 | | | | |

OPEN/BUSY STATE — 0:OPEN/1:BUSY

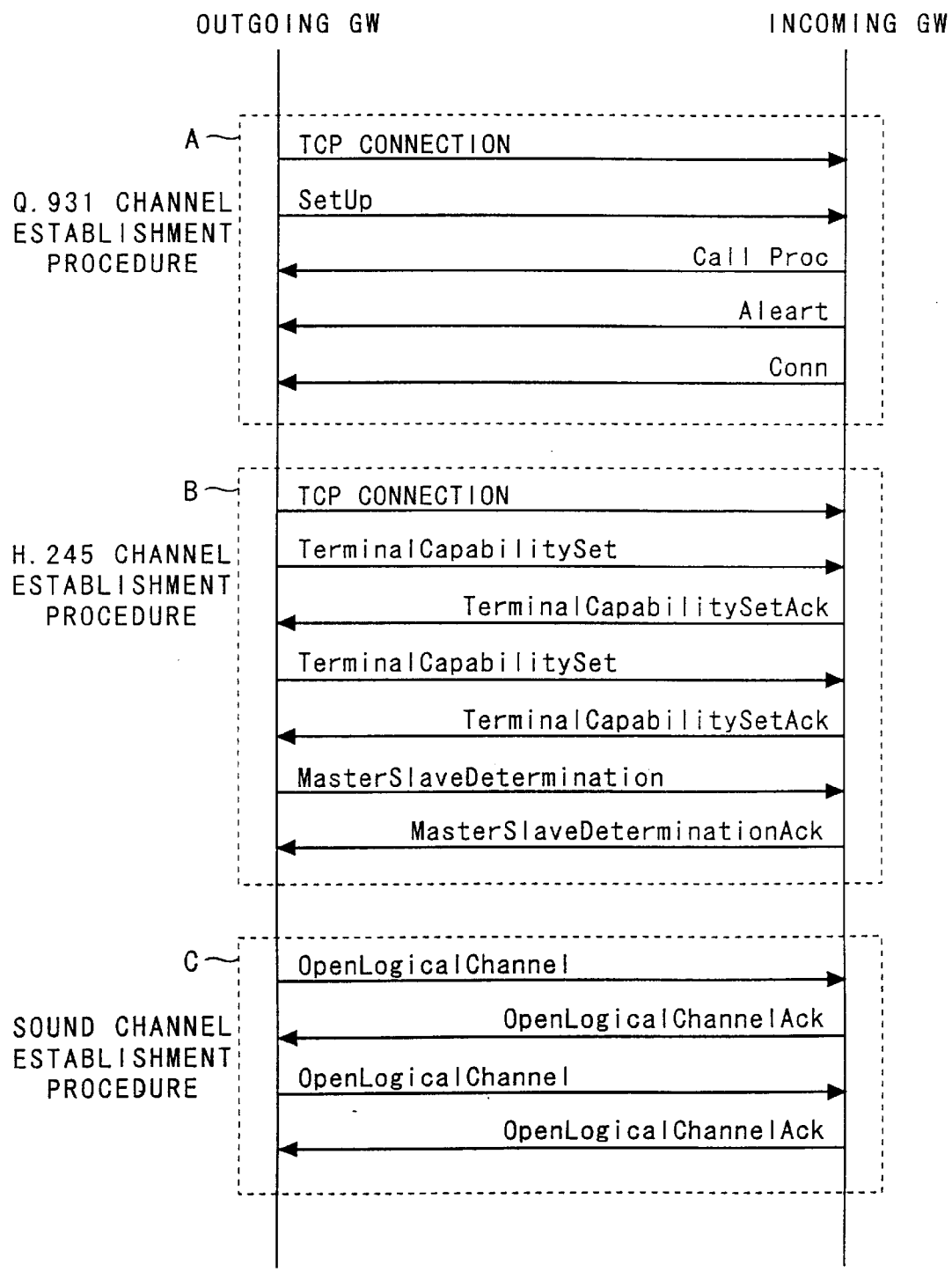

GATEWAY APPARATUS

BACKGROUND OF THE INVENTION

The present invention relates to a gateway apparatus arranged between circuit switched networks and the Internet to repeat data transmitted/received between the circuit switched networks through the Internet.

In recent years, with the development of network technology (increase in bandwidth of a local area network (LAN)), an increase in number of functions of a personal computer (PC), and the development of PC technology (e.g., increase in speed of a CPU (Central Processing Unit)), high-speed communication of sound (audio) data between PCs in a LAN is practically used.

As one of communication technology of sound data, a technology for transmitting the sound data through the Internet constituted by LANs and wide area networks (WANS) is known. This technique is called a voice over IP (VoIP) connection. Application software or systems based on the VoIP connection are called internet telephony (IT) and rapidly put on the market.

In recent years, an internet telephony gateway apparatus (to be referred to as a "gateway apparatus" hereinafter), having a gateway function for performing protocol conversion between a circuit switched network such as a telephone network and the Internet, for realizing two-way communication between the circuit switched networks and the Internet is developed. By using the gateway apparatus, an internet telephony system (IT system) for repeating data between conventional circuit switched networks (telephone networks) through the Internet is realized. The communication charge of this IT system is cheaper than the communication charge of a conventional system using the telephone network. Therefore, the IT system and services based on the IT system rapidly spread.

In the IT system described above, when sound data is transmitted/received between circuit switched networks through the Internet, an sound communication channel corresponding to a call between the circuit switched networks (between terminal devices) is set between gateway apparatuses on the Internet. In this manner, a call is set between the circuit switched networks (between the terminal devices). Thereafter, sound data is transmitted by using the installed communication channel. The sound communication channel is set such that the gateway apparatuses on an call-out side and an call-in side execute a procedure (to be referred to as a "H.323 procedure" hereinafter) based on H.323 protocol to the call set between the circuit switched networks. H.323 protocol is a communication protocol corresponding to VoIP recommended by ITU-T.

FIG. 13 is a sequence chart showing H.323 procedure. As shown in FIG. 13, H.323 procedure is constituted by the following procedures:

(1) A connection procedure (see procedure A in FIG. 11) of a control channel (to be referred to as a "Q.931 channel" hereinafter) based on Q.931 protocol;

(2) A connection procedure (see procedure B in FIG. 13) of a control channel (to be referred to as a "H.245 channel" hereinafter) based on H.245 protocol; and (3) A connection procedure (see procedure C in FIG. 13) of an sound channel.

As described above, the sound communication channel is constituted by the Q.931 channel, the H.254 channel, and the sound channel. These three channels are connected and established by the procedures A to C to establish a call. Thereafter, transmission and reception of sound data between the circuit switched networks are started.

In this case, Q.931 protocol is a communication protocol based on the basic call control specification of ISDN user network interface layer 3, and the Q.931 channel is a basic call control channel on the Internet. H.245 protocol is control protocol for multimedia communication, and the H.245 channel is a control channel for multimedia communication. The protocol and the channel are used to exchange capability data between the gateway apparatuses. The sound channel is a channel for transmitting an IP packet in which sound data is stored.

Conventionally, the H.323 procedure is started when the gateway apparatus on the call-out side receives call setting request between circuit switched networks from the circuit switched network on the call-out side. For this reason, the H.323 procedure must be executed from time when the circuit switched network transmits a call setting request to time when the circuit switched networks on the call-out side and a call-in side starts transmission/reception of sound data.

When the gateway apparatus on the call-out side receives a plurality of call setting requests from the circuit switched network on the call-out side, the H.323 procedures corresponding to the call setting requests are executed in the reception order. For this reason, when the gateway apparatus on the incoming side receives a large number of call setting requests for a short time (when a traffic intensity increases) execution of H.323 procedures corresponding to call setting requests, which are relatively lately received, of the large number of call setting requests is delayed, and a call setting (connection) process between the circuit switched networks and the start of transmission/reception of sound data may be delayed.

SUMMARY OF THE INVENTION

It is an object of the present invention to provide a gateway apparatus being capable of suppressing the probability that a call connection process (call setting process) is delayed even if a traffic intensity between low-order networks in a complex network in which a plurality of low-order networks (e.g., circuit switched networks) are connected to a high-order network (e.g., the Internet) through the gateway apparatus.

The present invention employs the following configuration to solve the problem described above.

The first aspect of the present invention, there is provided a gateway apparatus arranged between a circuit switched network and the Internet comprising: a prior connection section setting a channel on the Internet according to a call setting request received from the circuit switched network before the call setting request is received from the circuit switched network; and a call setting section setting a connection corresponding to the call setting request on the Internet by using the communication circuit set by the prior connection section when the call setting request is received from the circuit switched network.

According to the first aspect, since the communication circuit is set by the prior connection section in advance, the process of setting the channel need not be performed when a connection corresponding to the call setting request is set by the call setting section. Therefore, since time required for the call setting process (call connection process) can be shortened, the probability that the call setting process is delayed when a traffic intensity increases can be suppressed.

In the present invention, the Internet indicates network using the internet protocol (IP) as protocol of layer 3, i.e., indicates an internet protocol network, and includes intranets and the like. In addition, the circuit switched network is, for example, a telephone network or a PBX network.

In the second aspect of the present invention, there is provided a gateway apparatus, arranged between a circuit switched network and the Internet, executing a connection procedure of a control channel based on Q.931 protocol, a connection procedure of a control channel based on H.245 protocol and a connection procedure of an sound channel according to a call setting request received from a circuit switched network, comprising: a prior connection section executing the connection procedure of the control channel based on Q.931 protocol before the call setting request is received from the circuit switched network; and a call setting section setting a connection corresponding to the call setting request on the Internet by using the control channel based on Q.931 protocol set by the prior connection section when the call setting request is received from the circuit switched network According to the second aspect, since the control channel based on Q.931 protocol is set by the prior connection section in advance, when the call setting section sets a call corresponding to the call setting request, the connection procedure of the control channel based on Q.931 protocol need not be performed. Therefore, since time required for the call setting process (call connection process) can be shortened, the probability that the call setting process is delayed when a traffic intensity increases can be suppressed.

The third aspect of the present invention is specified as follows. That is, the connection procedure of a control channel based on H.245 protocol is executed before the prior connection section according to the second aspect receives a call setting request received from the circuit switched network, and when the call setting request is received from the circuit switched network the call setting section sets a call corresponding to the call setting request by using the control channel based on Q.931 protocol and the control channel based on H.245 protocol set by the prior connection section. With this configuration, time required for the call setting process can be made shorter than that in a case wherein the connection procedure of the control channel based on H.245 protocol after the call setting request is received.

The fourth aspect of the present invention is specified as follows. That is, the prior connection section according to the third aspect executes the connection procedure of the sound channel before the call setting request is received from the circuit switched network, and when the call setting request is received from the circuit switched network, the call setting section sets the connection corresponding to the call setting request on the Internet by using the control channel based on Q.931 protocol, the control channel based on H.245 protocol, and the sound channel set by the prior connection section. With this configuration, time required for the call setting process can be made shorter than that in a case wherein the connection procedure of the sound channel after the call setting request is received.

The fifth aspect of the present invention is specified as follows. That is, the gateway apparatus according to the second aspect further comprises: a traffic monitor section monitoring a traffic volume in the gateway apparatus; and a channel count change section changing the number of control channels based on Q.931 protocol connected by the prior connection section according to a monitor result of the traffic monitor section.

The sixth aspect of the present invention is specified as follows. The gateway apparatus according to the third aspect further comprises: a traffic monitor section monitoring a traffic volume in the gateway apparatus; and a channel count change section changing the number of control channels connected by the prior connection section and based on Q.931 protocol and the number of control channels connected by the prior connection section and based on H.245 protocol depending on a monitor result of the traffic monitor section.

The seventh aspect of the present invention is specified as follows. The gateway apparatus according to the fourth aspect further comprises: a traffic monitor section monitoring a traffic volume in the gateway apparatus; and a channel count change section changing the number of control channels connected by the prior connection section and based on Q.931 protocol, the number of control channels connected by the prior connection section and based on H.245 protocol, and the number of sound channels connected by the prior connection section depending on a monitor result of the traffic monitor section.

The channel count change sections according to the fifth to seventh aspects increase the numbers of control channels when traffic intensities increase and decrease the numbers of control channels when traffic intensities decrease.

According to the fifth to seventh aspects, since the numbers of control channels can be changed depending on the traffic intensities, call setting processes in the gateway apparatuses can be efficiently operated, and resources related to the connection of the control channels can be efficiently used.

The eighth aspect of the present invention is specified as follows. The gateway apparatus according to the second aspect further comprises: a channel count change section changing the number of control channels connected by the prior connection section and based on Q.931 protocol depending on an input channel count change request.

The ninth aspect of the present invention is specified as follows. The gateway apparatus according to the third aspect further comprises: a channel count change section changing the number of control channels connected by the prior connection section and based on Q.931 protocol and the number of control channels connected by the prior connection section and based on H.245 protocol depending on an input channel count change request.

The tenth aspect of the present invention is specified as follows. The gateway apparatus according to the fourth aspect further comprises: a channel count change section changing the number of control channels connected by the prior connection section and based on Q.931 protocol, the number of control channels connected by the prior connection section and based on H.245 protocol, and the number of sound channels connected by the prior connection section depending on an input channel count change request.

According to the eighth to tenth aspects, as in the fifth to seventh aspects, call setting processes in the gateway apparatus can be efficiently operated, and resources related to the connection of the control channels can be efficiently used.

The eleventh aspect of the present invention is specified as follows. That is, the gateway apparatuses according to the eighth aspect further comprises input devices for inputting channel count change requests.

The twelfth aspect of the present invention is specified as follows. That is, the channel count change requests in the eighth aspect is input from the circuit switched networks.

In the eighth aspect, the channel count change request may be input from terminal devices directly connected to the gateway apparatuses or input from terminal devices connected to the gateway apparatuses through circuit switched networks.

BRIEF DESCRIPTION OF THE DRAWINGS

FIGS. 3A and 3B are charts for explaining a channel count management table shown in FIG. 2.

FIG. 4 is a chart for explaining a channel number management table shown in FIG. 2.

FIG. 13 is a sequence chart showing a call setting procedure in the network system shown in FIG. 1.

DETAILED DESCRIPTION OF THE PREFERRED EMBODIMENT

An embodiment of the present invention will be described below with reference to the accompanying drawings.

<<Entire Configuration of Network System>>

Figure 1:
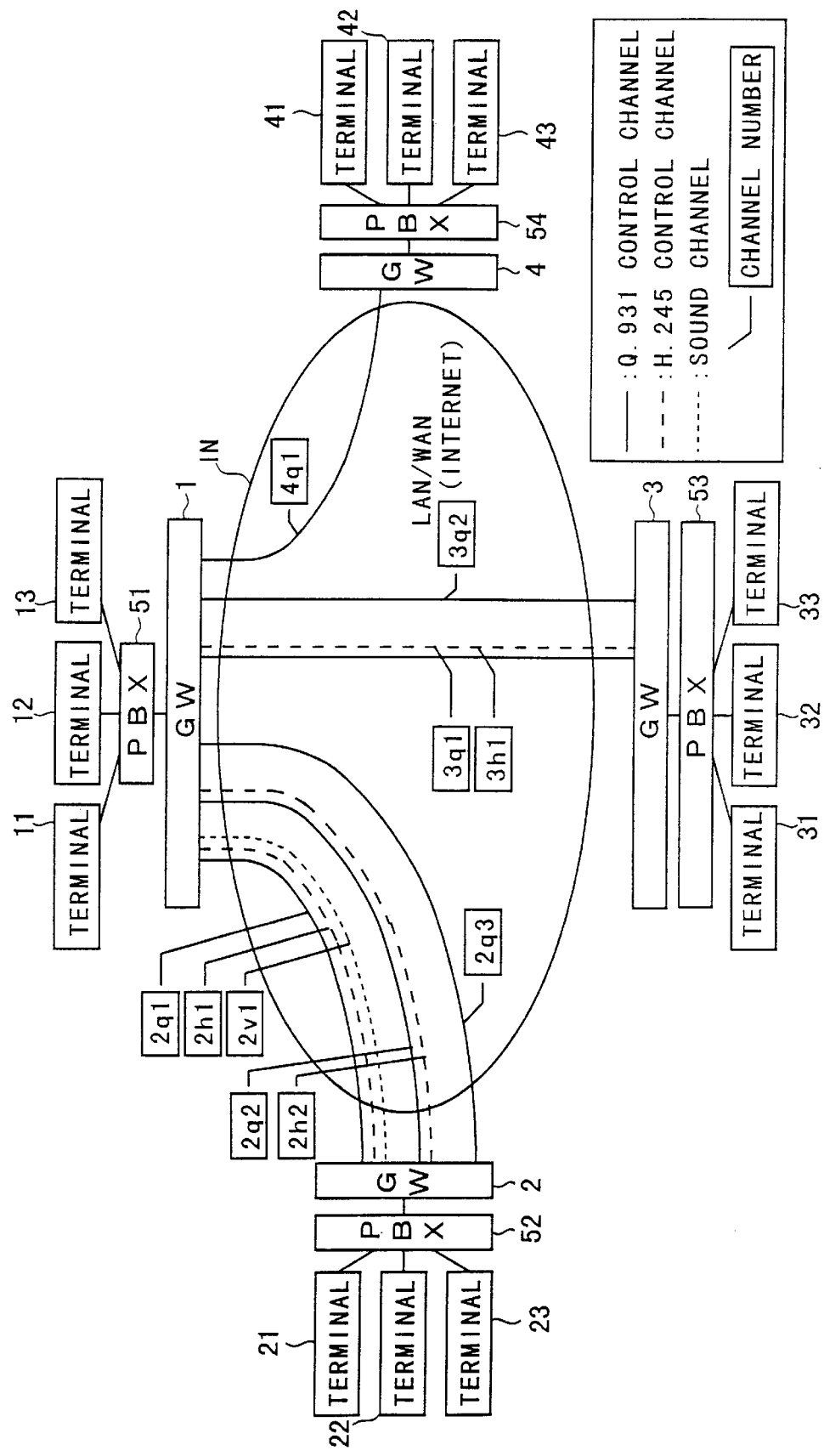
FIG. 1 is a diagram showing an entire configuration of a network system to which a gateway apparatus according to an embodiment of the present invention is applied.

FIG. 1 is a diagram showing a network system (IT system) to which a gateway apparatus according to the embodiment of the present invention is applied. FIG. 1, the network system is a complex network in which first to fourth circuit switched networks (telephone networks) are connected to the Internet IN through gateway apparatuses (to be referred to as "GWs" hereinafter) 1 to 4. The Internet IN is constituted by LANs and WANs.

The first circuit switched network is constituted by a private branch exchange (PBX) 51 in which terminal devices (telephone sets) 11 to 13 are accommodated. The PBX 51 is connected to a GW 1. The second circuit switched network is constituted by a PBX 52 in which terminal devices 21 to 23 are accommodated. The PBX 52 is connected to the GW 2. The third circuit switched network is constituted by a PBX 53 in which terminal devices 31 to 33 are stored. The PBX 53 is connected to the GW 3. The fourth circuit switched network is constituted by a PBX 54 in which terminal devices 41 to 43 are stored. The PBX 54 is connected to the GW 4.

Each of the PBXs 51 to 54 controls sound communication between the terminal device (low-order terminals) connected with the corresponding PBX in a circuit switched network to which the corresponding PBX belongs. When a call setting request (call-out request) received from the low-order terminal requests communication with another terminal device of another circuit switched network, each of the PBXs 51 to 54 gives a call setting request corresponding to the call setting request to a high-order GW. Thereafter, sound data received from the low-order terminal which transmits the call setting request is transmitted to the high-order GW. On the other hand, when a call setting request (call-in request) is received from the high-order GW, each of the PBXs 51 to 54 causes a corresponding low-order terminal to receive the call corresponding to the call-out request. Thereafter, sound data from the high-order GW is transmitted to the low-order terminal.

Each of the GWs 1 to 4 is connected to the Internet IN through physical circuits and performs call setting processes between circuit switched networks through the Internet IN. When each of the GWs 1 to 4 receives a call setting request (call-out request) from a PBX (low-order PBX) connected to the corresponding GW, after a logical communication channel (logical channel) for transmitting sound data is set between the corresponding GW and another GW corresponding to a target place of the call setting request on the Internet IN, the corresponding GW transmits the sound data received from the low-order PBX through the logical channel to the other GW. On the other hand, when each of the GWs 1 to 4 receives a call setting request (call-in request) from another GW, the corresponding GW set a logical channel for transmitting sound data between the other GW and the corresponding GW and transmits the call-in request to a low-order PBX. Thereafter, the GW transmits sound data received from the other GW through the set logical channel to the low-order PBX.

<<Configuration of Gateway Apparatus>>

Figure 2:
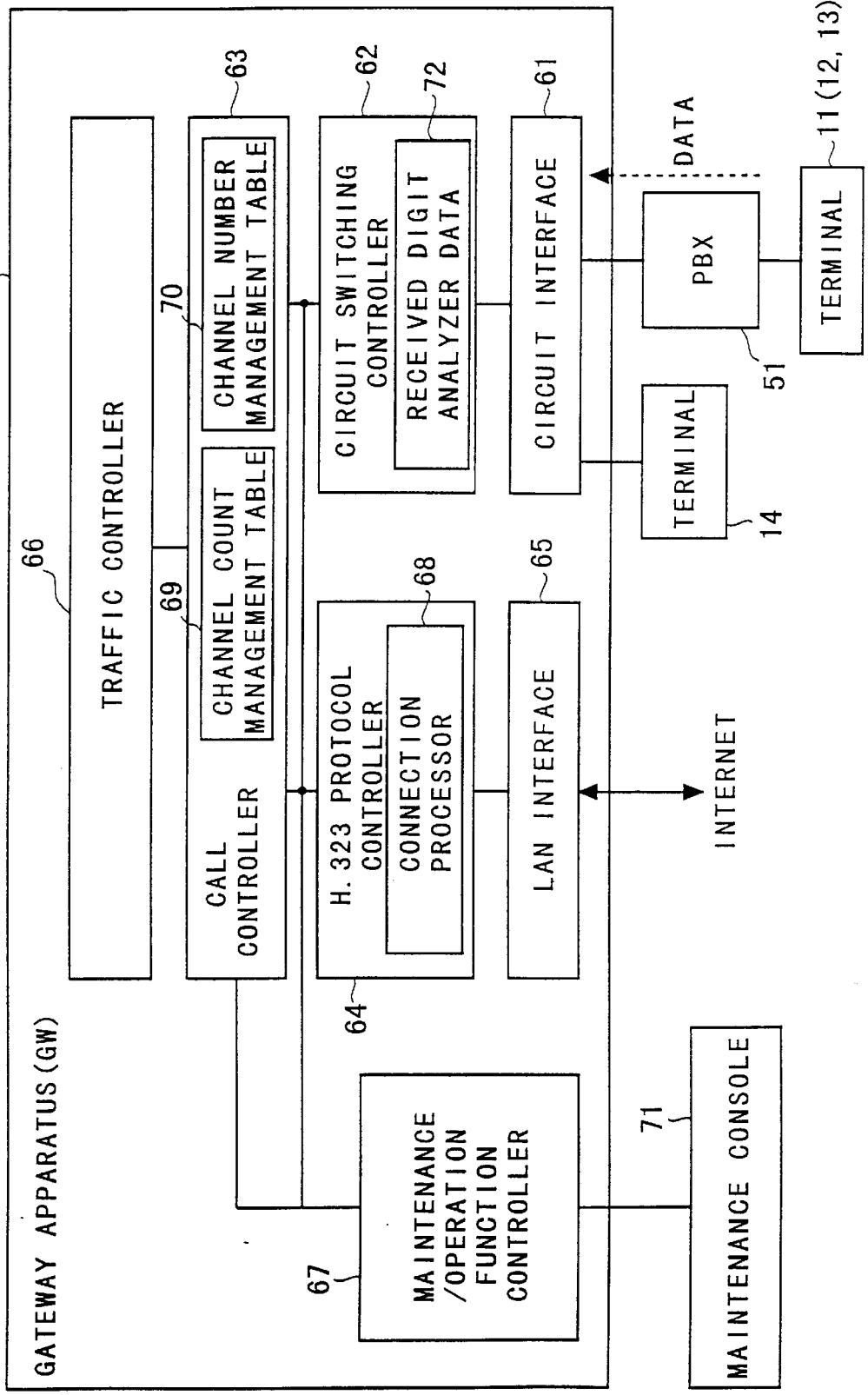
FIG. 2 is a functional block diagram of the gateway apparatus shown in FIG. 1.

FIG. 2 is a functional block diagram of each of the GWs 1 to 4 shown in FIG. 1. Since the GWs 1 to 4 have configurations which are almost identical with each other, a functional block diagram of the GW 1 is shown in FIG. 2 as an example.

In FIG. 2, the GW 1 has a circuit interface 61, a circuit switching controller 62 connected to the circuit interface 61, a call controller 63 connected to the circuit switching controller 62, an H.323 protocol controller 64 connected to the call controller 63, and a LAN interface 65 connected to the H.323 protocol controller 64. The GW 1 has a traffic controller 66 connected to the call controller 63 and a maintenance/operation function controller 67 connected to the call controller 63 and the circuit switching controller 62. A maintenance console 71 is connected to the maintenance/operation function controller 67.

Each block in the GW 1 shown in FIG. 2 is constituted by a CPU, peripheral devices including a memory device in which various programs and data are stored and a communication device, and the like as hardware. The CPU executes various programs, and the peripheral devices are operated according to an execution result of the programs, so that functions are realized.

The call controller 63 and the H.323 protocol controller 64 (connection processor 68) correspond to a prior connection section, a call setting section, and a channel count change section according to the present invention. The traffic controller 66 corresponds to a traffic monitor section according to the present invention. The maintenance console 71 corresponds to an input device according to the present invention.

The circuit interface 61 is connected to the PBX 51 through a plurality of telephone circuits. The circuit interface 61 converts the forms of an input call control message and sound data into forms which can be used on the output side to output the call message and the sound data to the circuit interface 61 or the call controller 63.

The circuit switching controller 62 gives a call control message received from the circuit interface 61 to the call controller 63. The circuit switching controller 62 controls the circuit switch of the circuit interface 61 according to an instruction received from the call controller 63.

The circuit switching controller 62 has a reception digit analyzer 72. When the GW 1 receives data consisting of dial digits such as "prior connection channel count change special number+channel count to be changed" from terminal devices 11 to 13 connected to the PBX 51 or the terminal device (telephone set) 14 connected to the circuit interface 61, the reception digit analyzer 72 analyzes the data as a request for a third channel count change process and notifies the call controller 63 of the request. The "prior connection channel" and the "third channel count change process" will be described later.

The call controller 63 manages control related to a call between circuit switched networks through the GW 1. The call controller 63 manages resources for controlling a call through the GW 1 and converts communication protocol of the circuit switched network side and communication protocol of the Internet IN side and executes communication between the circuit switched networks. The call controller 63 analyzes control signals and call control messages received from the circuit switching controller 62, the H.323 protocol controller 64, the traffic controller 66 and the maintenance/operation function controller 67. The call controller 63 gives an instruction based on the analysis result to the circuit switching controller 62 and the H.323 protocol controller 64.

The H.323 protocol controller 64 performs a process based H.323 protocol according to the instruction received from the call controller 63. The H.323 protocol controller 64 has the connection processor 68. The connection processor 68 executes the H.323 procedure shown in FIG. 13 to set logical channels for sound data transmission between the GW 1 and the GWs 2 to 4 on the Internet IN. The logic channel is constituted by a Q.931 channel, an H.245 channel, and an sound channel.

The LAN interface 65 is connected to the Internet IN through a physical circuit in which the logical channels are set. The LAN interface 65 converts form of an call control message or sound data into the form in which can be used on the output side of the LAN interface 65, and gives the message and the sound data to the Internet IN or the H.323 protocol controller 64.

The traffic controller 66 periodically measures traffic volumes (traffic intensity) of each of output-paths in the GW 1, and determines states ("high", "normal", and "low") in which the measured traffic volumes are set. When transition occurs in the traffic volumes, the traffic controller 66 notifies the call controller 63 of the occurrence of transition.

The maintenance/operation function controller 67 gives an instruction based on an input signal from the maintenance console 71 to the call controller 63. For example, when the maintenance/operation function controller 67 receives an input signal corresponding to a command related to a change request of a prior connection channel from the maintenance console 71, the maintenance/operation function controller 67 notifies the change request of the prior connection channel to the call controller 63. The maintenance/operation function controller 67 receives information related to the operations of the circuit switching controller 62, the call controller 63, and the H.323 protocol controller 64 to give the information to the maintenance console 71.

The maintenance console 71 is formed such that an input device constituted by a pointing device such as a keyboard, a mouse, a joy stick, or a track ball, a display device such as a CRT or an LCD, and an output device constituted by a printing device such as a printer are combined to each other.

The maintenance console 71 outputs the information received-from the maintenance/operation function controller 67, so that the maintenance console 71 can display or print the information related to the operations of the circuit switching controller 62, the call controller 63, and the H.323 protocol controller 64. On the other hand, the maintenance console gives an input signal corresponding to a command related to maintenance and operation of the circuit switching controller 62, the call controller 63, or the H.323 protoco controller 64 input by an operator through the input device to the maintenance/operation function controller 67.

<<Operation of GW>>

As described above, logical channels (Q.931. channel, H.245 channel, and sound channel) are set on the Internet IN by the GW 1 with reception of a call setting request from a low-order PBX. In contrast to this, even if the GW 1 is started by turning on the power source of the GW 1, the GW 1 performs the H.323 procedure or a part thereof (procedure A or procedures A and B shown in FIG. 13), predetermined numbers of Q.931 channels, H.245 channels, and sound channels between the GW 1 and the GWs 2 to 4. This process is called a "prior connection process", and each channel set without receiving a call setting request is called a "prior connection channel" which means a channel set before the call setting request is received.

The GW 1 changes the number of prior connection channels depending on a traffic volume in the GW 1 and a request of an operator or the like. This process is called a "channel count change request". The channel count change request is constituted by first to third channel count change processes corresponding to the types of occasions for the start of the channel count change process. The details of the prior connection process and the first to third channel count change processes will be described later.

In order to cause the GW 1 to execute the prior connection process and the first channel count change process described above, the call controller 63 has a channel count management table 69 in which information of prior connection channels to be set are stored, and a channel number management table 70 in which information of actually set prior connection channels are stored.

FIGS. 3A and 3B are charts for explaining the channel count management table 69 shown in FIG. 2, and FIG. 4 is a chart for explaining the channel number management table 70 shown in FIG. 2. As shown in FIG. 3A, the channel count management table 69 comprises a plurality of connection count storing areas for storing channel connection counts prepared per channel numbers, and these connection count storing areas are searched for by using a path number as a key.

The path number is the number of the output-path of the GW 1 on the Internet IN side. For example, the path numbers are prepared depending on the number of other GWs connected to the Internet IN. In this example, path numbers are prepared depending on the other GWs 2 to 4 (see FIG. 1) with respect to the GW 1. A path number "2" in FIG. 3A is the number of an output-path toward the GW 2, a path number "3" is the number of an output-path toward the GW 3, and a path number "4" is the number of an output-path toward the GW 4.

Each of the connection count storing areas is constituted by three areas in which connection counts of the Q.931 channel, the connection counts of H.245 channel, and the sound channel constituting the prior connection channels are stored, each area holds connection counts of channels prepared depending on the traffic volume of the output-path in the GW 1. In this example, the traffic volume is constituted by three levels, i.e., "high", "normal", and "low". The connection counts of channels corresponding to the traffic volumes are stored. As shown in FIG. 3A, the connection count of each channel is set such that the number of prior connection channels becomes large as the traffic volume is high.

The connection count of the H.245 channel corresponding to each path number does not exceed the connection count of the Q.931 channel corresponding to the path number, and the connection count of the sound channel corresponding to each path number does not exceed the connection counts of the Q.931 channel and the H.245 channel.

FIG. 3B shows the number of prior connection channels set when traffic volumes corresponding to the path numbers 2 to 4 in the stored contents of the channel count management table 69 are "normal". In the GW 1, by using the number of prior connection channels set in the "normal" state as an initial value, the channels shown in FIG. 3B are set by the prior connection process. On the other hand, the number of prior connection channels obtained when the traffic volume is "low" or "high" in the stored contents of the channel count management table 69 is referred to in the first channel count change process.

As shown in FIG. 4, the channel number management table 70 is constituted by storing areas (number storing area) of channel numbers prepared for respective path numbers, and each number storing area is searched by using the path number as a key. In each number storing area, the channel numbers of the Q.931 channel, the H.245 channel, and the sound channel actually set as prior connection channels and the open/busy states of the Q.931 channel, the H.245 channel, and the sound channel are stored.

In FIG. 4, a channel number is expressed by, for example, two digits and one alphabet. The left digit represents a path number, the alphabet represents the type of a channel (q: Q.931 channel, h: H.245 channel, and v: sound channel), and the right digit represents the place of a channel.

The open/busy state is represented by one bit. "0" represents an open state, and "1" represents a busy state. FIG. 4 shows the stored contents of the channel number management table 70 obtained when the prior connection channels are set according the contents show in FIG. 3B.

Figure 5:
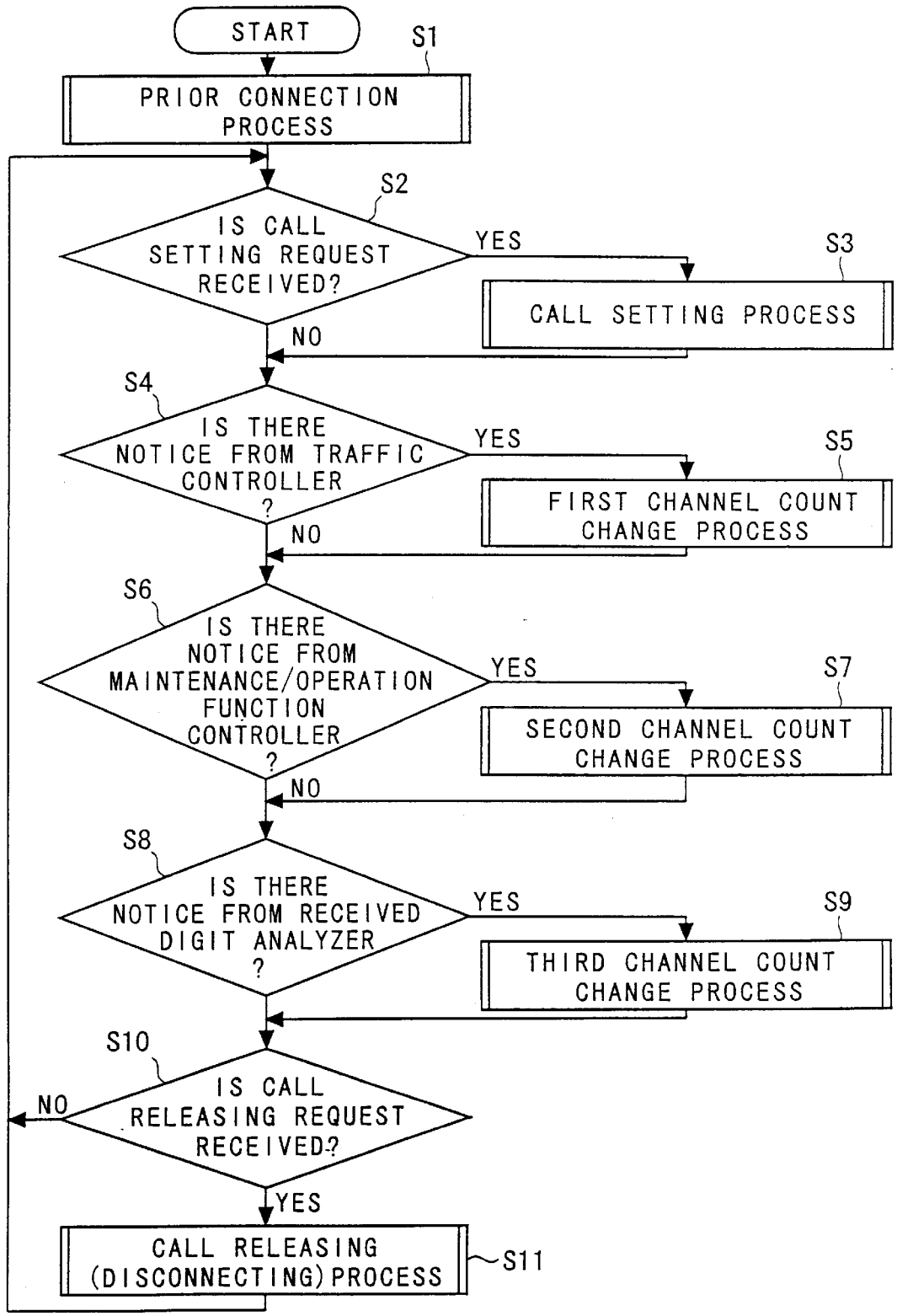
FIG. 5 is a flow chart showing a main routine of the gateway apparatus shown in FIG. 2.

FIG. 5 is a flow chart showing a main routine of the GW 1 shown in FIG. 2, and the main routine is mainly executed by the call controller 63. The call controller 63 starts execution of the main routine when the power supply of the GW 1 is turned on.

First, the call controller 63 executes the sub-routine of the prior connection process (step S1). Thereafter, it is checked whether the call controller 63 receives the message (VoIP connection request) of a call setting request from a circuit switched network (PBX 51) (step S2). At this time, if the call setting request is received (S2; Y), the call controller 63 executes the sub-routine of the call setting process (step S3). Thereafter, the process shifts to step S4. On the other hand, if no call setting request is received (S2; N), the process shifts to step S4.

When the process shifts to step S4, it is checked whether the call controller 63 receives a notice related to transition of a traffic volume, i.e., a notice that one of the traffic volumes of the path numbers 2 to 4 changes to one of "high", "normal", and "low" from the traffic controller 66. If the call controller 63 receives the notice (S4; Y), after the call controller 63 executes the sub-routine of the first channel count change process (step S5), the process shifts to step S6. Otherwise (S4; N), the process shifts to step S6.

When the process shifts to step S6, it is checked whether the call controller 63 receives a notice related to a change request of the prior connection channel from the maintenance/operation function controller 67. At this time, if the call controller 63 receives the notice (S6; Y), after the call controller 63 executes the sub-routine of the second channel count change process (step S7), the process shifts to step S8. Otherwise (S6; N), the flow shifts to step S8.

When the process shifts to step S8, it is checked whether the call controller 63 receives a notice related to a request of the third channel change process from the reception digit analyzer 72. At this time, if the call controller 63 receives the notice (S8; Y), after the call controller 63 executes the sub-routine of the third channel count change process (step S9), the process shifts to step S10. Otherwise (S8; N), the process shifts to step S10.

When the process shifts to step S10, it is checked whether the call controller 63 receives a call releasing request (call cutting request) from the PBX 51 or the Internet IN. At this time, if the call controller 63 receives the call releasing request (S10; Y), after the call controller 63 executes the sub-routine of a call releasing (cutting) process (step S11) the process returns to step S2. If the call controller 63 does not receive the call releasing request (S10; N), the process returns to step S2.

In the main routine shown in FIG. 5, the process of transmitting sound data received from the Internet IN or the PBX 51 to an originating side is omitted. However, when the GW 1 receives the sound data from the Internet IN or the PBX 51, the call controller 63 transmits the received sound data to an sound channel or a telephone circuit of an output-path corresponding to the target place through the LAN interface 65 or the circuit interface 61.

The sub-routines of the prior connection process, the call setting process, the first to third channel count change processes, and the call releasing process shown in FIG. 5 will be described below.

<Prior Connection Process>

Figure 6:
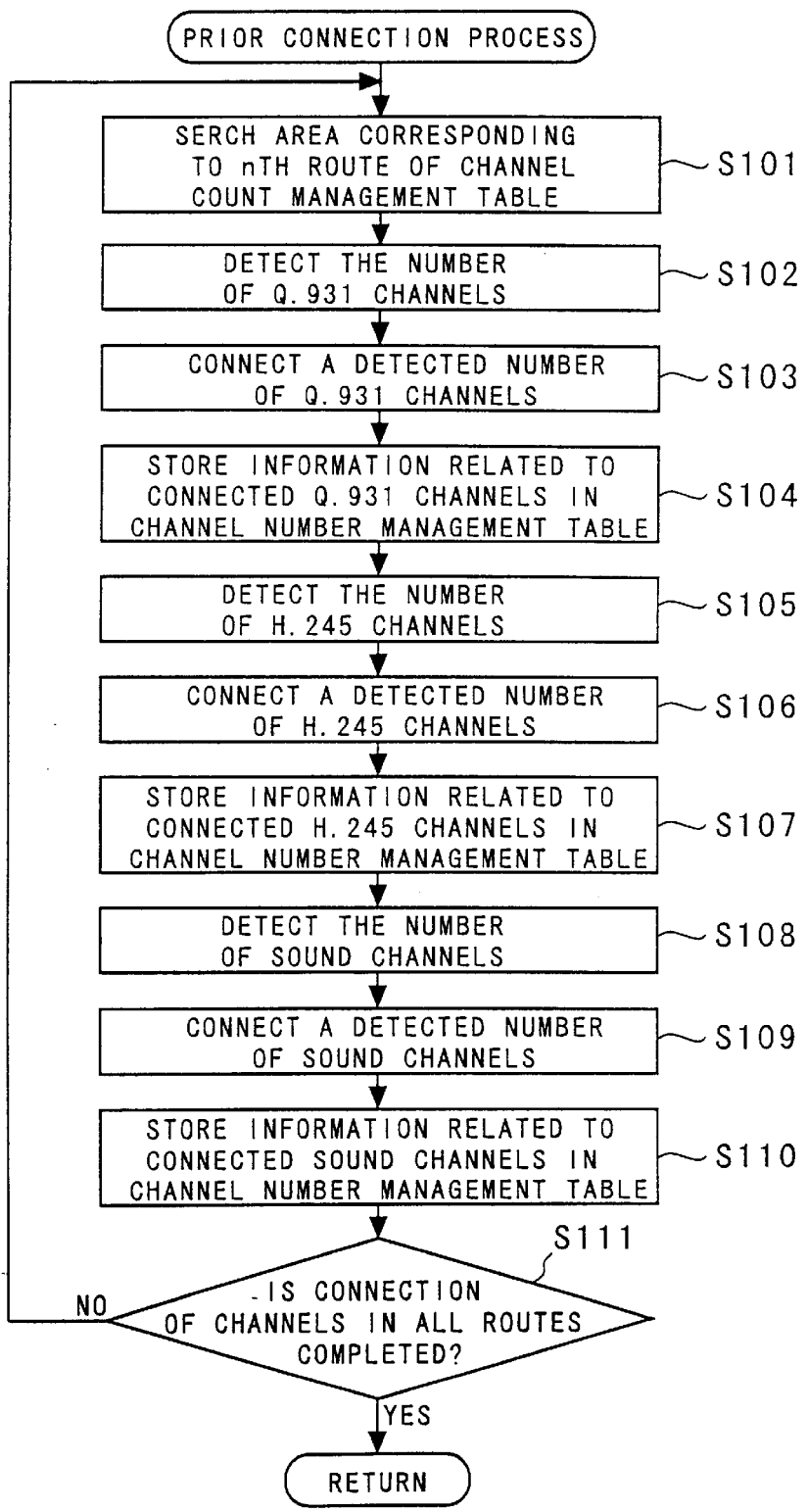
FIG. 6 is a flow chart showing a prior connection process shown in FIG. 5.

FIG. 6 is a flow chart showing the prior connection process shown in FIG. 5. In FIG. 6, first, the call controller 63 searches for a connection count storing area corresponding to nth (n=2, 3, or 4) path number of the channel count management table 69 shown in FIG. 3 (step S101). In step S101 of the first cycle, a connection count storing area corresponding to path number "2" is searched.

Subsequently, the call controller 63 detects the connection count of the Q.931 channel in a "normal" state stored in the connection count storing area searched in step S101 (step S102). At this time, the call controller 63 detects "3" as a connection count (see FIG. 3B).

Subsequently, the call controller 63 gives a connection instruction of the Q.931 channel to the connection processor 68. The connection instruction includes a path number and a connection count. The connection processor 68 executes a procedure A (see FIG. 13) according to the path number and the connection count by using the GW 1 as an incoming GW. In this manner, the Q.931 channels serving as three prior connection channels are connected and established between the GW 1 and the GW 2 (step S103).

Thereafter, the call controller 63 stores the channel numbers and the open/busy states of the Q.931 channels connected in step S103 in the channel number management table 70 shown in FIG. 4 (step S104).

Subsequently, the call controller 63 detects the connection count of the H.245 channel corresponding to path number "2" and set in a "normal" state from the channel count management table 69 (step S105). At this time, the call controller 63 detects "2" as a connection count (see FIG. 3B).

Subsequently, the call controller 63 gives a connection instruction of the H.245 channel to the connection processor 68. The connection instruction includes a path number and a connection count. The connection processor 68 executes a procedure B (see FIG. 13) according to the path number and the connection count by using the GW 1 as an incoming GW. In this manner, the H.245 channels serving as two prior connection channels are connected and established between the GW 1 and the GW 2 (step S106).

Thereafter, the call controller 63 stores the channel numbers and the open/busy states of the H.245 channels connected in step S106 in the channel number management table 70 (step S107).

Subsequently, the call controller 63 detects the connection count of the sound channel in a "normal" state stored in the connection count storing area searched in step S101 (step S108). At this time, the call controller 63 detects "1" as a connection count (see FIG. 3B).

Subsequently, the call controller 63 gives a connection instruction of the sound channel to the connection processor 68. The connection instruction includes a path number and a connection count. The connection processor 68 executes a procedure C (see FIG. 13) according to the path number and the connection count by using the GW 1 as an incoming GW.

In this manner, an sound channel serving as one prior connection channel is connected and established between the GW 1 and the GW 2 (step S109).

Thereafter, the call controller 63 stores the channel numbers and the open/busy states of the sound channels connected in step S109 in the channel number management table 70 (step S107).

Thereafter, the call controller 63 checks whether connection and establishment of the prior connection channels of all the routes (output-paths corresponding to path numbers "2" to "4") are ended (step S111). At this time, if the establishment of all the prior connection channels in a "normal" state is not ended (S111; N), the call controller 63 returns the process to step S101 and performs a connection process of the prior connection channels in the "normal" state corresponding to path number "3" or "4". In contrast to this, if the establishment of all the prior connection channels in the "normal" state is ended (S111; Y), the call controller 63 ends the sub-routine of the prior connection process and causes the process to shift to step S2 of the main routine shown in FIG. 5.

Upon completion of the prior connection process described above, as shown in FIG. 1, a plurality of prior connection channels depending on the contents shown in FIG. 3B are set between the GW 1 and the GWs 2 to 4, and the stored contents of the channel number management table 70 of the GW 1 are equal to the contents shown in FIG. 4.

In the channel number management table 70 of the GW 2, the channel number of the prior connection channel set between the GW 1 and the GW 2 is stored. In the channel number management table 70 of the GW 3, the channel number of the prior connection channel set between the GW 1 and the GW 3 is stored. In the channel number management table 70 of the GW 3, the channel number of the prior connection channel set between the GW 1 and the GW 3 is stored.

For this reason, in each of procedures A to C executed by the prior connection process, a message transmitted from the GW 1 includes information representing that the corresponding procedure is a procedure for connecting prior connection channels. Each of the GWs 2 to 4 stores the channel number of the prior connection channel set by the procedure including the information in the channel number management table 70.

<Call Setting Process>

FIG. 6 is a flow chart showing the sub-routine of the call setting process shown in FIG. 5. As a pre-process of the sub-routine, the call controller 63 analyzes the message of a received call setting request, extracts information of a terminal device (incoming terminal) at a target place from the call setting request, specifies the path number (request path number) of an output-path (to be referred to as a "request route" hereinafter) corresponding to the call-in terminal, and causes the process to shift to step S201.

When the process shifts to step S201, the call controller 63 searches the channel number management table 70 (see FIG. 4) by using the request path number as a key to check whether the number of Q.931 channels (to be referred to "corresponding Q.931 channels" hereinafter) serving as prior connection channels corresponding to the request path number is zero. More specifically, it is checked whether the channel number of the corresponding Q.931 channel (corresponding Q.931 channel number) is stored in the channel number management table 70.

At this time, if the corresponding Q.931 channel is not stored (S201; Y), it is considered that there is no corresponding Q.931 channel, the process shifts to step S203. On the other hand, a single corresponding Q.931 channel or a plurality of corresponding Q.931 channels are stored in the channel number management table 70 (S201; N), the process shifts to step S204.

When the process shifts to step S202, the call controller 63 checks whether the corresponding Q.931 channels detected in step S201 include corresponding Q.931 channels set in an open state. More specifically, the call controller 63 checks whether there is a corresponding Q.931 channel number whose open/busy state is "0".

At this time, if there is no corresponding Q.931 channel number whose open/busy state is "0", i.e., if the open/busy states of all the corresponding Q.931 channels are "1" (S202; N), it is considered that all the corresponding Q.931 channels are busy, and the process shifts to step S203. In contrast to this, if there is a corresponding Q.931 channel number whose open/busy state is "0" (S202; Y), the process shifts to step S204.

When the process shifts to step S203, the call controller 63 performs the following known conventional processes. More specifically, the call controller 63 gives a control instruction to the connection processor 68, and the connection processor 68 executes the H.323 procedure (see FIG. 13) by using the GW 1 as an incoming GW, so that a logical channel is set between the GW 1 and an incoming GW (one of the GW 2 to GW 4) corresponding to a request route. Upon completion of the process in step S203, the sub-routine of the call setting process, and the process returns to the main routine shown in FIG. 5. Thereafter, finally, a call between terminal devices (circuit switched networks) using the GW 1 as an incoming GW is established, and sound communication is performed between the outgoing terminal (one of the terminal devices 11 to 14) and an outgoing terminal.

When the process shifts to step S204, the call controller 63 extracts one corresponding Q.931 channel number whose open/busy state is "0", and the open/busy state of the extracted corresponding Q.931 channel number is set to be "1" ("1"=busy). At this time, there are a plurality of corresponding Q.931 channels, the smallest channel number is selected.

Subsequently, the call controller 63 checks whether the number of H.245 channels (to be referred to as "corresponding H.245 channels" hereinafter) serving as prior connection channels corresponding to a request path number is zero (step S205). More specifically, the call controller 63 checks whether the channel number (corresponding H.245 channel number) of a corresponding H.245 channel is stored.

At this time, the corresponding H.245 channel number is not stored (S205; Y), it is considered that there is no corresponding H.245 channel, the process shifts to step S207. On the other hand, a single H.245 channel number or a plurality of H.245 channel numbers are stored (S205; N), the process shifts to step S206.

When the process shifts to step S206, the call controller 63 checks whether there is a corresponding H.245 channel number whose open/busy state is "0". At this time, if there is no corresponding H.245 channel number (S206; N), the process shifts to step S207. In contrast to this, if there is a corresponding H.245 channel number whose open/busy state is "0" (S206; Y), the process shifts to step S210.

When the process shifts to step S207, the call controller 63 generates a message (call-in message) of a call-in request including the Q.931 channel number extracted in step S204 to one of the GWs 2 to 4 (incoming GW) corresponding to a request route, and transmits the message from the LAN interface 61.

Subsequently, the call controller 63 gives a control instruction of the H.245 channel to the connection processor 68. At this time, the connection processor 68 executes a procedure B by using the GW 1 as an incoming GW, so that an H.245 channel corresponding to the request route is connected and established between the GW 1 and the incoming GW (step S208).

Subsequently, the call controller 63 gives a connection instruction of an sound channel to the connection processor 68. At this time, the connection processor 68 executes a procedure C by using the GW 1 as an incoming GW, so that an sound channel corresponding to the request route is connected and established between the GW 1 and the incoming GW (step S209). Upon completion of the process of step S209, the sub-routine of the call setting process is ended.

By the processes of steps S207 to S209 described above, the incoming GW refers to the contents of the call-in message, omits the connection procedure (procedure A) of the Q.931 channel, and performs setting procedures (procedure B and procedure C) of the H.245 channel and the sound channel corresponding to the request route are performed between the GW 1 and the incoming GW. In this manner, when a logical channel depending on the request route is set between the GW 1 and the incoming GW, the incoming GW causes an incoming terminal to receive a call-in request corresponding to the call-in message through a low-order PBX. In this manner, a call between terminal devices using the GW 1 as an incoming GW is set and established. More specifically, VoIP connection is established. Thereafter, sound communication is performed between an outgoing terminal (one of the outgoing terminals 11 to 14) and the incoming terminal.

On the other hand, the process shifts to step S210, the call controller 63 extracts one of the corresponding H.245 channel numbers whose open/busy states are "0", and sets the open/busy state corresponding to the channel number to be "1". At this time, there are a plurality of corresponding H.245 channel numbers, the smallest channel number is selected.

Subsequently, the call controller 63 checks whether the number of sound channels (to be referred to as "corresponding sound channels" hereinafter) serving as prior connection channels corresponding to a request path number is zero (step S211). More specifically, the call controller 63 checks whether the channel number (corresponding sound channel number) of a corresponding sound channel is stored.

At this time, the corresponding sound channel number is not stored (S211; Y), it is considered that there is no corresponding sound channel, the process shifts to step S213. On the other hand, a single sound channel number or a plurality of sound channel numbers are stored (S211; N), the process shifts to step S212.

When the process shifts to step S212, the call controller 63 checks whether there is a corresponding sound channel number whose open/busy state is "0". At this time, if there is no corresponding sound channel number (S212; N), the process shifts to step S213. In contrast to this, if there is a corresponding sound channel number whose open/busy state is "0" (S212; Y), the process shifts to step S215.

When the process shifts to step S213, the call controller 63 generates a call-in message including the corresponding Q.931 channel number extracted in step S204 and the corresponding H.245 channel number extracted in step S210, and transmits the call-in message from the LAN interface 61 to the incoming GW (one of the GWs 2 to 4) corresponding to the request route.

Upon completion of the process of step S213, the same process as that of step S209 is performed (step S214). When the sound channel corresponding to the request route is connected and established between the GW 1 and the incoming GW, the sub-routine of the call setting process is ended.

By the processes of steps S213 to S214 described above, the incoming GW refers to the contents of the call-in message, omits the procedure A and the procedure B, and performs only the procedure C between the GW 1 and the incoming GW. In this manner, when a logical channel depending on the request route is set between the GW 1 and the incoming GW, the incoming GW causes an incoming terminal to receive a call-in request corresponding to the call-in message through a low-order PBX. In this manner, a call between terminal devices using the GW 1 as an incoming GW is established, and sound communication is performed between the outgoing terminal and the incoming terminal.

On the other hand, the process shifts to step S215, the call controller 63 extracts one of the corresponding sound channel numbers whose open/busy states are "0", and sets the open/busy state corresponding to the channel number to be "1". At this time, there are a plurality of corresponding to sound channel numbers, the smallest channel number is selected.

Subsequently, the call controller 63 generates a call-in message including the corresponding Q.931 channel number, the corresponding H.245 channel number, and the corresponding sound channel number extracted in steps S204, S210, and S215, and transmits the call-in message from the LAN interface 61 to the incoming GW corresponding to the request route (step S216).

Upon completion of the process of step S216, the sub-routine of the call setting process is ended. By the process of step S216, the incoming GW refers to the contents of the call-in message, omits H.323 procedures (procedures A to C) because the logical channel corresponding to the request route is set as a prior connection channel in advance, and causes the incoming terminal to receive the call-in request corresponding to the call-in message. In this manner, a call between terminal devices by using the GW 1 as an outgoing GW is established, and sound communication using the logical channel constituted by the prior connection channel between the outgoing terminal and the incoming terminal.

Figure 12:
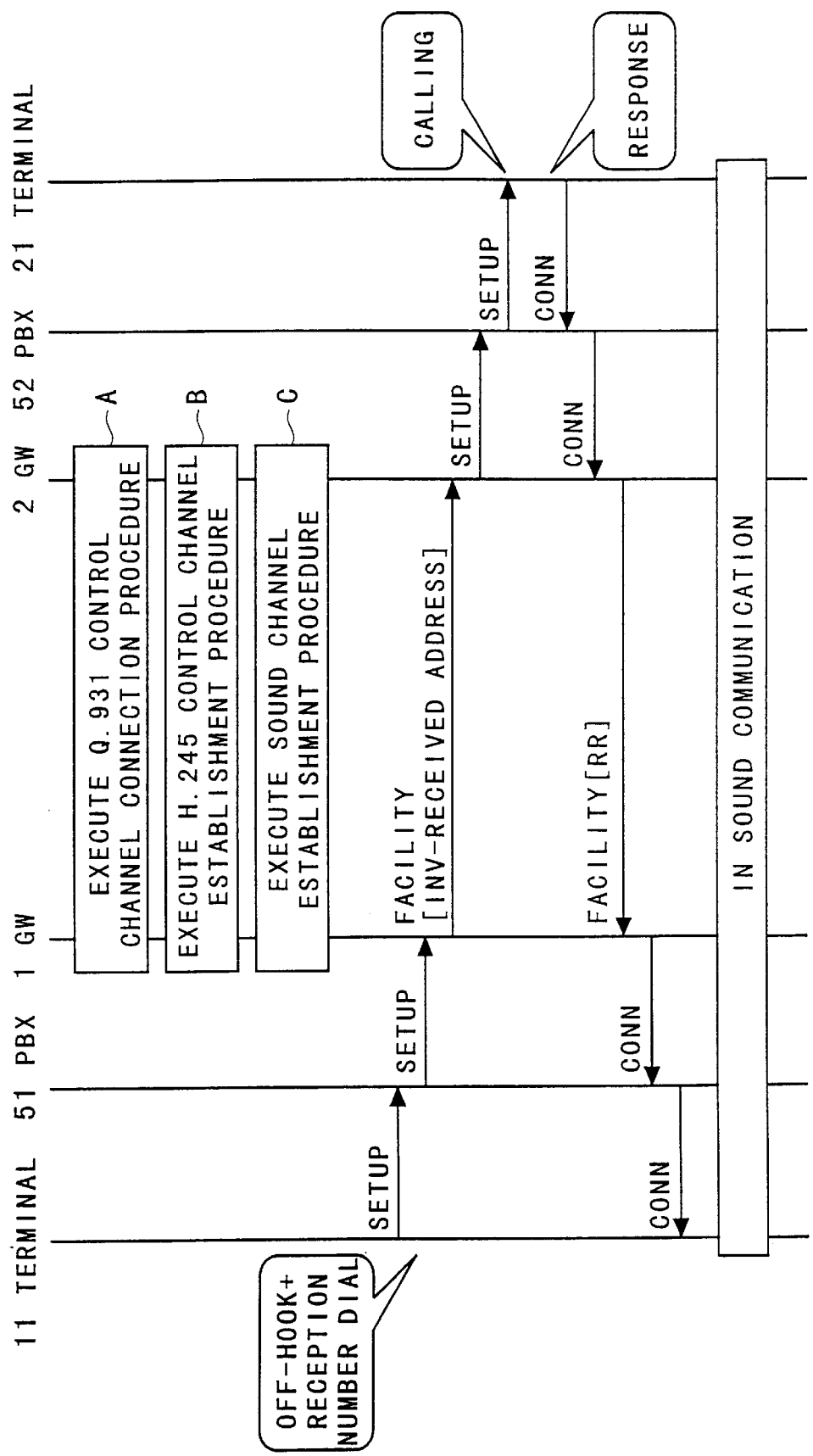
FIG. 12 is a sequence chart showing an operation in the network system shown in FIG. 1.

FIG. 12 is a sequence chart showing a call setting procedure in the network system shown in FIG. 1. In FIG. 12, for example, a case wherein a terminal device 11 and a terminal device 12 perform sound communication by using the terminal device 11 as an outgoing terminal is shown. When the power supply of the GW 1 is turned on, as shown in FIG. 12, an H.323 procedure (see FIG. 13) performed by the prior connection process (see FIG. 6) described above is executed, and the prior connection channels shown in FIG. 1 and FIG. 4 are set between the GW 1 and the GW 2.

Thereafter, for example, when the prior channels set between the GW 1 and the GW 2 are not used, the terminal device 11 is set in an off-hook state, and the call number of a terminal device 21 is dialed (input). At this time, SETUP serving as a message (VoIP connection request) of a call setting request including the address of the terminal device 21 is transmitted from the terminal device 11, and the SETUP is received by the GW 1 through the PBX 51.

Figure 7:
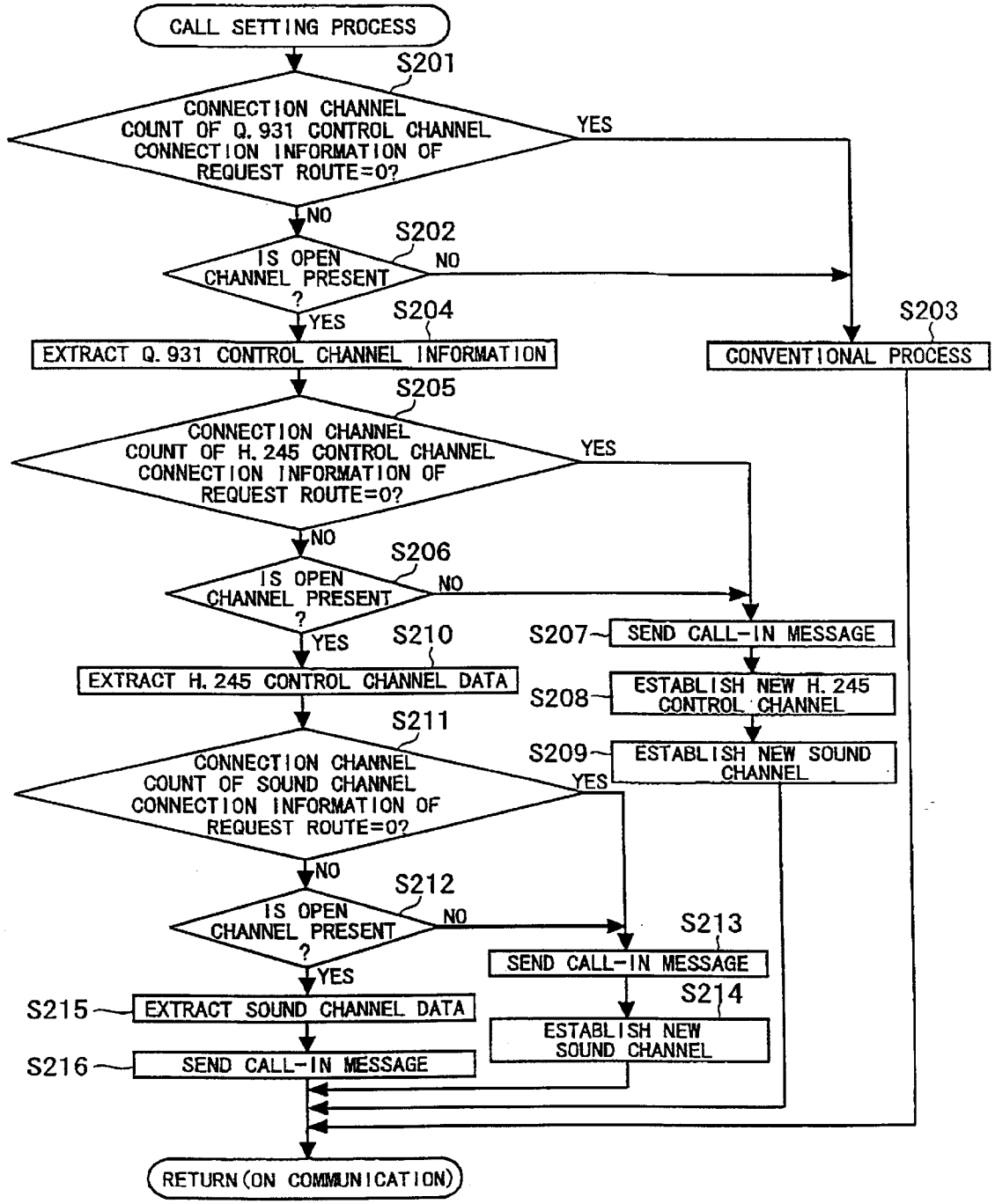
FIG. 7 is a flow chart showing a call setting process shown in FIG. 5.

When the GW 1 receives the SETUP from the PBX 51, the call setting process shown in FIG. 7 is executed. In this call setting process, the channel number management table 70 is searched by a path number "2", a corresponding Q.931 channel number 2q1, a corresponding H.245 channel number 2h1, and a corresponding sound channel number 2v1 which are in open states are extracted. The channels corresponding to the extracted channel numbers are determined as logical channels used depending on the VoIP connection request.

Thereafter, a call-in request message including the extracted channel numbers and the address of the terminal device 21 is transmitted to the GW 2. As the call-in request message, for example, a FACILITY message including a reception address information element as an invoke information element is used.

When the GW 2 receives the FACILITY message from the GW 1, the message is analyzed, and the respective channel numbers and the address of the terminal device 21 are extracted. In the GW 2, it is recognized that the VoIP connection is established by using the channels corresponding to the extracted channel numbers, and the H.323 procedure started with reception of the FACILITY message is omitted. Thereafter, the SETUP serving as a call-in request message including the address of the terminal device 21 is transmitted to the terminal device 21 through the PBX 52. When the SETUP is received by the terminal device 21, the terminal device 21 outputs ring-back tone.

When the terminal device 21 is set in an off-hook state depending on the ring-back tone, the terminal device 21 transmits a response message of the SETUP (CONN), and the CONN is received by the GW 2 through the PBX 52. At this time, the GW 2 generates a response message corresponding to the CONN to transmits the response message to the GW 1. As the response message, for example, a FACILITY message including a return result information element is used.

When the GW 1 receives the FACILITY message from the GW 2, a response message (CONN) corresponding to the FACILITY message is generated, and the response message is transmitted to the PBX 51. Thereafter, the CONN is received by the terminal device 11 through the PBX 51, a call between the terminal device 11 and the terminal device 21, i.e., VoIP connection is established, and a state in which two-way sound communication can be performed is set. When this call set and established, speech communication is made between the terminal device 11 and the terminal device 21.

As described above, in the call setting process, a prior connection channel set by the prior connection process is preferentially used to set a call. When there is no prior connection channel depending on a request route, or when all prior connection channels depending on the request route are busy, a channel connection process by the conventional H.323 procedure is performed.

<First Channel Count Change Process>

Figure 8:
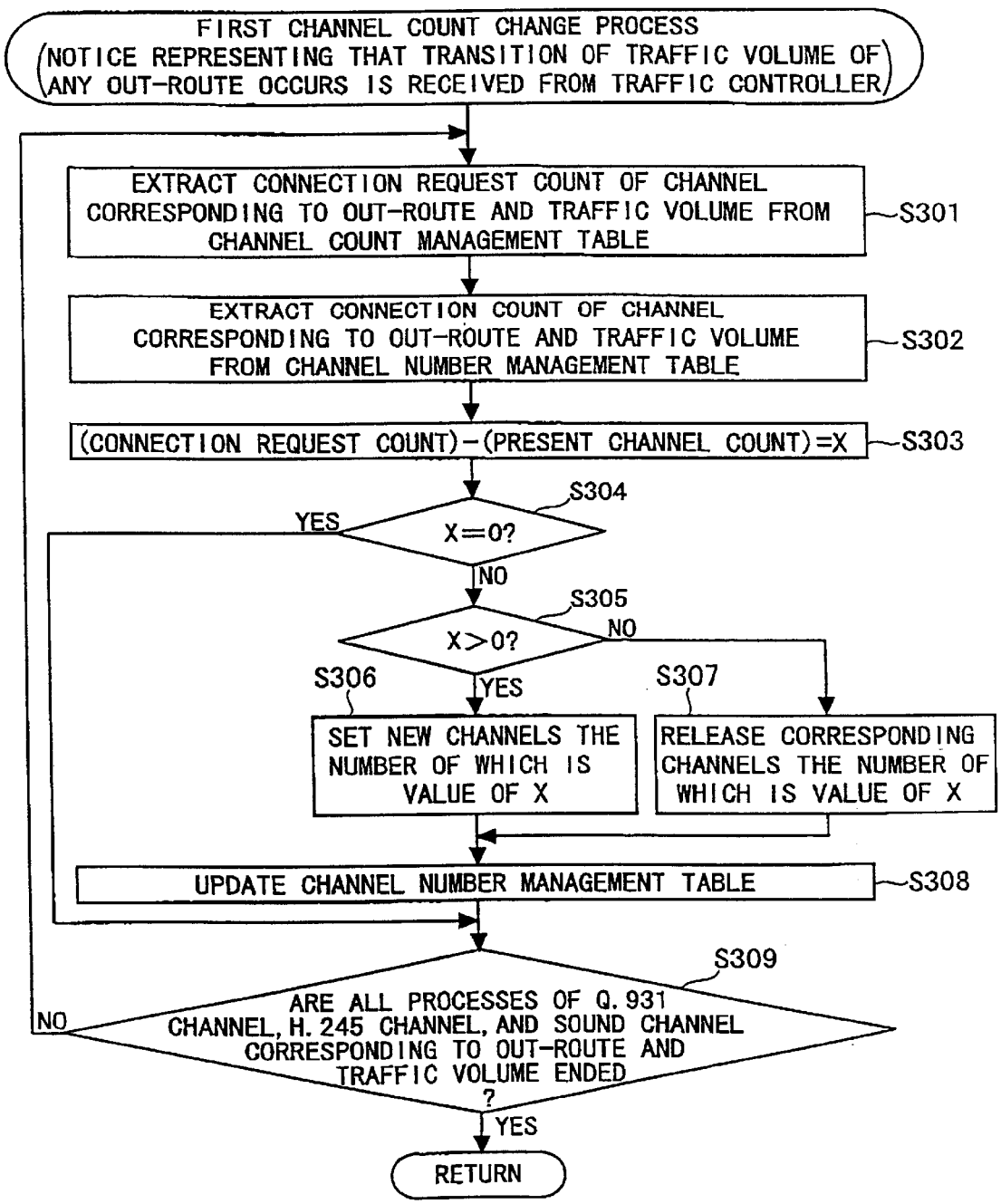
FIG. 8 is a flow chart showing a first channel count change process shown in FIG. 5.

FIG. 8 is a flow chart showing the sub-routine of the first channel count change process shown in FIG. 5. As shown in FIG. 8, the first channel count change process is started when the call controller 63 receives a notice from the traffic controller 66. The notice includes a path number at which transition of a traffic volume occurs and a traffic volume (one of "low", "normal", and "high") obtained after transition.

First, the call controller 63 searches the channel count management table 69 by using the noticed path number as a key, extracts a connection count (connection request count) of a Q.931 channel depending on the noticed traffic volume (step S301), and causes the process to shift to step S302. The connection count of the corresponding Q.931 channel is extracted as described above in the process of step S301 of the first cycle, the connection count of the corresponding H.245 channel is extracted in the second cycle, and the connection count of the corresponding the sound channel is extracted in the third cycle.

When the process shifts to step S302, the call controller 63 searches the channel number management table 70 by using the noticed path number as a key to extract the number of channel number count (present channel count) of the Q.931 channel corresponding to the path number.

Subsequently, the call controller 63 subtract the present channel count from the connection request count of the Q.931 channel to obtain a value X (step S303). Subsequently, the call controller 63 checks whether the value of X is zero (step S304). If X=0 (S304; Y), the call controller 63 causes the process to shift to step S309. Otherwise (S304; N), the call controller 63 causes the process to shift to step S305.

When the process shifts to step S305, the call controller 63 checks whether the value of X is larger than zero. If X>0 (S305; Y), the call controller 63 causes the process to shift to step S306. Otherwise (S305; N), the call controller 63 causes the process to shift to step S307.

When the process shifts to step S306, the call controller 63 causes the connection processor 68 to execute the procedure A to connect and establish new Q.931 channels the number of which is equal to the value of X. In this manner, the number of Q.931 channels serving as prior connection channels corresponding to the path number increases. Thereafter, the call controller 63 stores the channel numbers and the open/busy states of the newly set Q.931 channels in the channel number management table 70 (step S308), and the process shifts to step S309.

In contrast to this, when the process shifts to step S307, the call controller 63 releases the Q.931 channels, the number of which is equal to the value of X, serving as the prior connection channels set at present. However, the Q.931 channels to be released are busy, the releasing process is set in a standby state. Thereafter, the call controller 63 causes the process to shift to step S308 to erase the channel numbers and the open/busy states corresponding to the released Q.931 channels from the channel number management table 70, and causes the process to shift to step S309.

The releasing process set in a standby state in step S307 is executed upon completion of sound communication using the Q.931 channels. In this manner, the Q.931 channels are released, the channel numbers and the open/close states of the Q.931 channels are erased from the channel number management table 70.

When the process shifts to step S309, the call controller 63 checks whether channel count change processes corresponding to the Q.931 channel, the H.245 channel, and the sound channel corresponding to an output-path and a traffic volume are ended. If the channel count change processes are not ended, the process returns to step S301 to perform the channel count change processes of the H.245 channel and the sound channel corresponding to the output-path and the traffic volume (S301 to S308). In contrast to this, if all the channel count change processes are ended, the sub-routine of the first channel count change process is ended, the process returns to the main routine shown in FIG. 5.

According to the first channel count change process, the number of prior connection channels is automatically changed depending on a traffic volume. More specifically, when the traffic volume of a certain output-path increases, the number of prior connection channels of the output-path increases; when the traffic volume of a certain output-path decreases, the number of prior connection channels of the output-path decreases. In this manner, resources required to set Q.931 channels, H.245 channels, and sound channels can be efficiently used.

<Second Channel Count Change Process>

Figure 9:
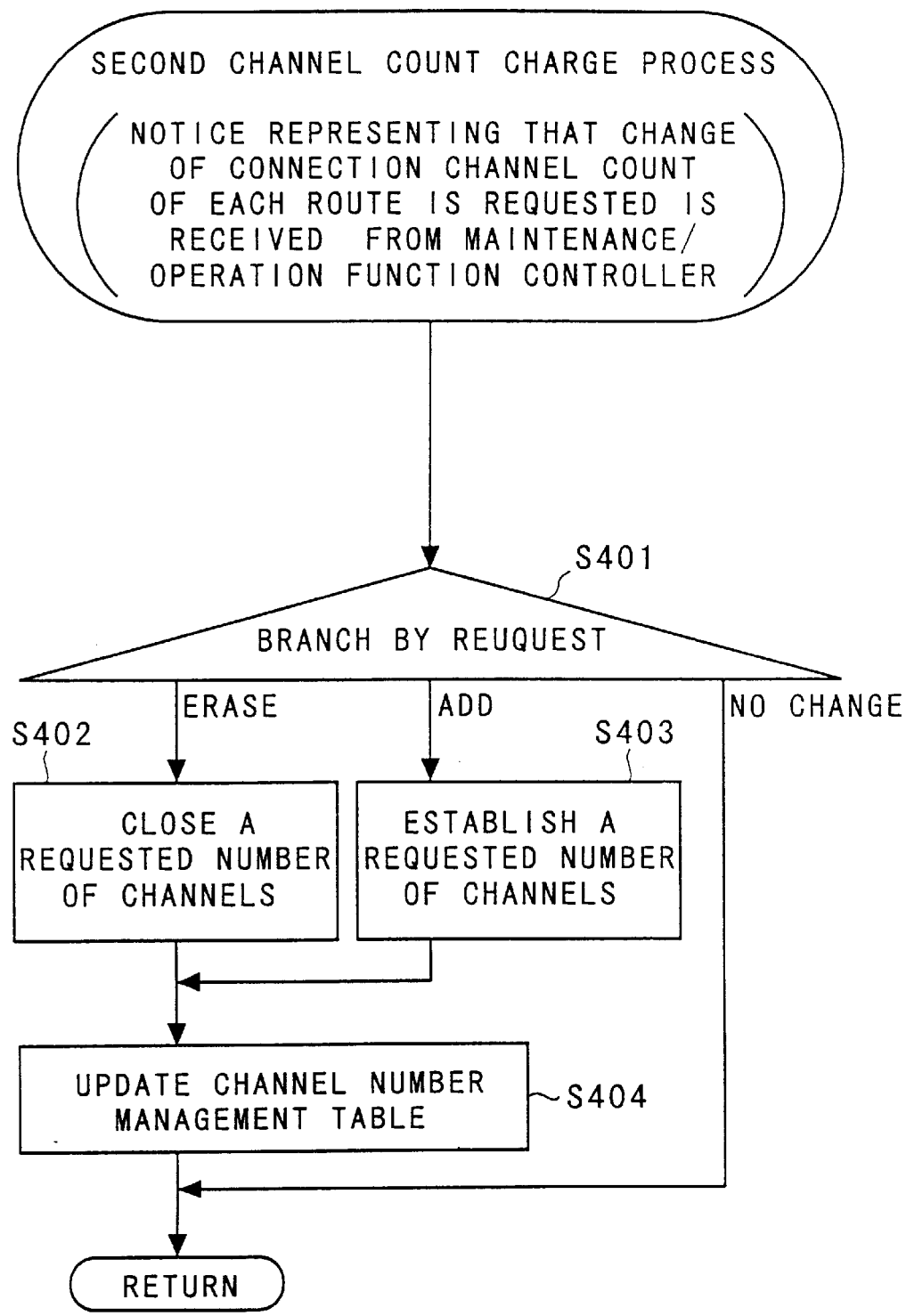
FIG. 9 is a flow chart showing a second channel count change process shown in FIG. 5.

FIG. 9 is a flow chart showing the sub-routine of the second channel count change process shown in FIG. 5. As shown in FIG. 9, the second channel count change process is started when the call controller 63 receives a notice from the maintenance/operation function controller 67. The notice includes a path number, type information of a channel (Q.931 channel, H.245 channel, or sound channel), change information of a channel (addition, erasing, and no change), and the number of added channels or erased channels.

First, the call controller 63 analyzes the notice received from the maintenance/operation function controller 67 (step S401). At this time, when the change information represents erasing of a channel, the call controller 63 causes the process to step S402. When the change information represents addition of a channel, the call controller 63 causes the process to shift to step S403. When the change information represents no change, the call controller 63 ends the sub-routine of the second channel count change process.

When the process shifts to step S402, the call controller 63 gives a releasing instruction which should release channels, the number of which is equal to the noticed number of erased channels, corresponding to the noticed path number and the noticed type information to the connection processor 68. The connection processor 68 releases the corresponding channel (one of Q.931 channel, H.245 channel, and sound channel) according to the releasing instruction. Thereafter, the channel numbers and the open/busy states of the released channels are erased from the channel number management table 70 (step S404), and the sub-routine of the second channel count change process is ended.

In contrast to this, when the process shifts to step S403, the call controller 63 gives a setting instruction which should set channels, the number of which is equal to the noticed number of added channels, corresponding to the noticed path number and the noticed type information to the connection processor 68. The connection processor 68 performs one of the procedures A to C according to the setting instruction to set a corresponding channel (one of Q.931 channel, H.245 channel, and sound channel). Thereafter, the channel number and the open/busy state corresponding to the set channel are stored in the channel number management table 70 (step S404), and the sub-routine of the second channel count change process is ended.

According to the second channel count change process, depending on a change request of a prior connection channel count input by an operator (e.g., manager of the GW 1) through the maintenance console 71, the number of prior connection channels is increased or decreased. More specifically, managers of the GW 1 can change the number of prior connection channels depending on the state of the GW 1 such as a traffic volume or using conditions of channel resources.

<Third Channel Count Change Process>

Figure 10:
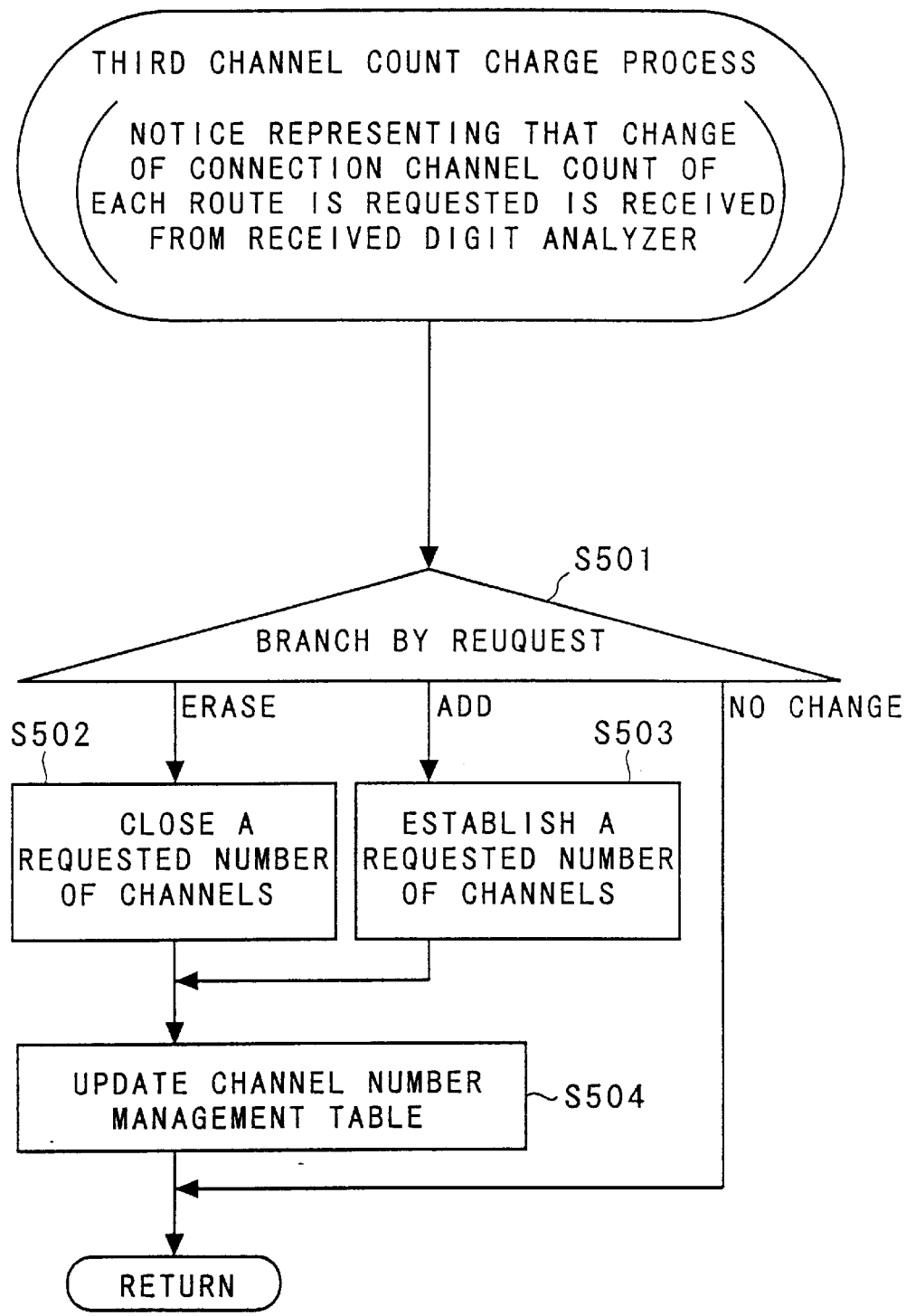
FIG. 10 is a flow chart showing a third channel count change process shown in FIG. 5.

FIG. 10 is a flow chart showing the sub-routine of the third channel count change process shown in FIG. 5. As shown in FIG. 10, the third channel count change process is started when the call controller 63 receives a notice from the reception digit analyzer 72. The notice includes a path number, type information of a channel (Q.931 channel, H.245 channel, or sound channel), change information of a channel (addition, erasing, and no change), and the number of added channels or erased channels.

First, the call controller 63 analyzes the notice received from the reception digit analyzer 72 (step S501). At this time, when the change information represents erasing of a channel, the call controller 63 causes the process to step S502. When the change information represents addition of a channel, the call controller 63 causes the process to shift to step S503. When the change information represents no change, the call controller 63 ends the sub-routine of the third channel count change process.

When the process shifts to step S502, the call controller 63 gives a releasing instruction which should release channels, the number of which is equal to the noticed number of erased channels, corresponding to the noticed path number and the noticed type information to the connection processor 68. The connection processor 68 releases the corresponding channel (one of Q.931 channel, H.245 channel, and sound channel) according to the releasing instruction. Thereafter, the channel numbers and the open/busy states corresponding to the released channels are erased from the channel number management table 70 (step S504), and the sub-routine of the third channel count change process is ended.

In contrast to this, when the process shifts to step S503, the call controller 63 gives a setting instruction which should set channels, the number of which is equal to the noticed number of added channels, corresponding to the noticed path number and the noticed type information to the connection processor 68. The connection processor 68 performs one of the procedures A to C according to the setting instruction to set a corresponding channel (one of Q.931 channel, H.245 channel, and sound channel). Thereafter, the channel number and the open/busy state corresponding to the set channel are stored in the channel number management table 70 (step S404), and the sub-routine of the third channel count change process is ended.

According to the third channel count change process, depending on data consisting of dial digits such as "prior connection channel count change special number+channel count to be changed" input by users of the terminal devices 11 to 14, the number of prior connection channels is increased or decreased. More specifically, users of the terminal devices 11 to 14 can change the number of prior connection channels.

<Call Releasing Process>

Figure 11:
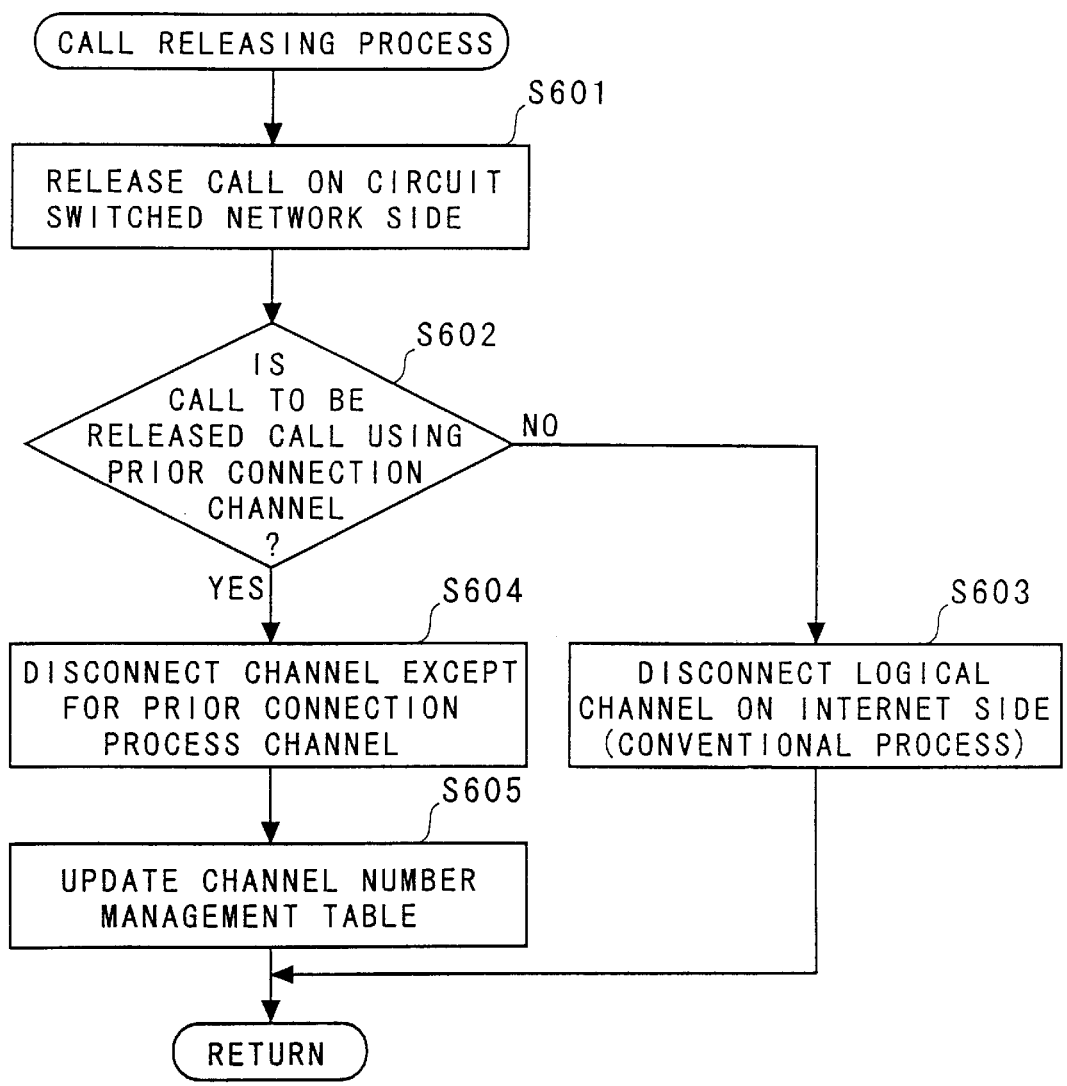
FIG. 11 is a flow chart a call releasing process shown in FIG. 5.

FIG. 11 is a flow chart showing the sub-routine of the call releasing process shown in FIG. 5. The sub-routine is started when the call controller 63 receives RELEASE or DISCONNECT serving as a call releasing message.

First, the call controller 63 gives a call releasing instruction to the circuit switching controller 62. The circuit switching controller 62 releases a call on a circuit switched network side corresponding to the call releasing message (step S601).

The call controller 63 specifies channels related to a call to be released on the basis of the call releasing message, and checks whether the specified channels include a prior connection channel (step S602). At this time, if the specified channels include no prior connection channel (S602; N), the process shifts to step S603. If the specified channels include a prior connection channel (S602; Y), the process shifts to step S604.

When the process shifts to step S603, the call controller 63 gives a releasing instruction corresponding to the call releasing message to the connection processor 68. The connection processor 68 disconnects logical channels (Q.931 channel, H.245 channel, and sound channel) on the Internet IN side according to the releasing instruction. In this manner, a call between circuit switched networks is released. Thereafter, the sub-routine of the call releasing process is ended.

When the process shifts to step S604, the call controller 63 gives a releasing instruction which should release channels of the channels related to the call to be released except for the prior connection channel to the connection processor 68. The connection processor 68 disconnects the corresponding channels according to the releasing instruction. In this manner, a call between circuit switched networks is released. Thereafter, the process shifts to step S605.

When the process shifts to step S605, the call controller 63 sets the open/busy state of the prior connection channel related to the released call to be "0" representing an open state, and ends the sub-routine of the call releasing process.

According to the call releasing process, when a call between terminal devices (between circuit switched networks) is released, channels of the logical channels related to the call except for the prior connection channel are disconnected, and the prior connection channel is kept set. Thereafter, when the GW 1 receives a call setting request from the low-order PBX 51, the call setting process (see FIG. 6) is executed, and a call is established by using the prior connection channel.

The above description explains the GW 1 as an example. However, processes which are almost identical to those in the GW 1 are performed in each of the other GWs 2 to 4.

<<Operation of Embodiment>>

According to the GWs in the embodiment, prior connection channels are set in the prior connection process, and VoIP connection is executed by using the prior connection channel in the call setting process. For this reason, when the VoIP connection is performed, at least one of the procedures A to C can be omitted. Therefore, a call setting process in the Internet IN can be shortened, and time required for the VoIP connection (call connection between circuit switched networks) can be shortened. In this manner, even the traffic intensities of the GWs increase, the probability that the call setting process (VoIP connection process) is delayed can be suppressed.

With the first channel count change process, the number of prior connection channels can be increased and decreased depending on a traffic volume. For this reason, when the traffic volume of a certain output-path increases, the number of prior connection channels corresponding to the output-path is increases, in the call setting process corresponding to the call setting require (VoIP connection require) after increasing, one of the procedures A to C can be omitted, therefore, time required the call setting process can be shortened. On the other hand, when the traffic volume of a certain output-path decreases, the number of prior connection channels corresponding to the output-path is decreases to allocate resources related to the number of disconnected prior connection channels to setting of other channels. Therefore, one of the procedures A to C in the call setting process can be efficiently omitted, and the resources required for channel setting can be effectively used.

Even in the second and third channel count change process, as in the first channel count change process, a call setting process can be efficiently omitted, and the resources required for channel setting can be effectively used.

What is claimed is:

1. A gateway apparatus, arranged between a circuit switched network and the Internet, executing a connection procedure of a control channel based on a Q.931 protocol, a connection procedure of a control channel based on an H.245 protocol and a connection procedure of a sound channel in order to set a connection on the Internet comprising:

a prior connection section executing the connection procedure of the control channel based on the Q.931 protocol before a call setting request is received from the circuit switched network;

a call setting section setting the connection corresponding to the call setting request on the Internet by using the control channel based on the Q.931 protocol set by the prior connection section when the call setting request is received from the circuit switched network;

a traffic monitor section monitoring traffic volume in the gateway apparatus; and a channel count change section changing the number of control channels based on the Q.931 protocol connected by the prior connection section according to a monitored result of the traffic monitor section.

2. A gateway apparatus, arranged between a circuit switched network and the Internet, executing a connection procedure of a control channel based on a Q.931 protocol, a connection procedure of a control channel based on an H.245 protocol and a connection procedure of a sound channel in order to set a connection on the Internet comprising:

a prior connection section executing the connection procedure of the control channel based on the Q.931 protocol before a call setting request is received from the circuit switched network;

a call setting section setting the connection corresponding to the call setting request on the Internet by using the control channel based on the Q.931 protocol set by the prior connection section when the call setting request is received from the circuit switched network;

a traffic monitor section monitoring traffic volume in the gateway apparatus; and a channel count change section respectively changing the number of control channels based on the Q.931 protocol and the number of control channels based on the H.245 protocol connected by the prior connection section according to a monitored result of the traffic monitor section, wherein the connection procedure of the control channel based on the H.245 protocol is executed by the prior connection section before the call setting request is received from the circuit switched network, and when the call setting request is received from the circuit switched network, the call setting section sets the connection corresponding to the call setting request on the Internet by using the control channel based on the Q.931 protocol and the control channel based on the H.245 protocol set by the prior connection section.

3. A gateway apparatus, arranged between a circuit switched network and the Internet, executing a connection procedure of a control channel based on a Q.931 protocol, a connection procedure of a control channel based on an H.245 protocol and a connection procedure of a sound channel in order to set a connection on the Internet comprising:

a prior connection section executing the connection procedure of the control channel based on the Q.931 protocol before a call setting request is received from the circuit switched network;

a call setting section setting the connection corresponding to the call setting request on the Internet by using the control channel based on the Q.931 protocol set by the prior connection section when the call setting request is received from the circuit switched network;

a traffic monitor section monitoring traffic volume in the gateway apparatus; and a channel count change section respectively changing the number of control channels based on the Q.931 protocol, the number of control channels based on the H.245 protocol and the number of sound channels connected by the prior connection section according to a monitored result of the traffic monitor section, wherein the connection procedure of the control channel based on the H.245 protocol is executed by the prior connection section before the call setting request is received from the circuit switched network, and when the call setting request is received from the circuit switched network, the call setting section sets the connection corresponding to the call setting request on the Internet by using the control channel based on the Q.931 protocol and the control channel based on the H.245 protocol set by the prior connection section, and wherein the prior connection section executes a connection procedure of the sound channel before the call setting request is received from the circuit switched network, and when the call setting request is received from the circuit switched network, the call setting section sets the connection corresponding to the call setting request on the Internet by using the control channel based on the Q.931 protocol, the control channel based on the H.245 protocol and the sound channel set by the prior connection section.

4. A gateway apparatus, arranged between a circuit switched network and the Internet, executing a connection procedure of a control channel based on a Q.931 protocol, a connection procedure of a control channel based on an H.245 protocol and a connection procedure of a sound channel in order to set a connection on the Internet comprising:

a prior connection section executing the connection procedure of the control channel based on the Q.931 protocol before a call setting request is received from the circuit switched network;

a call setting section setting the connection corresponding to the call setting request on the Internet by using the control channel based on the Q.931 protocol set by the prior connection section when the call setting request is received from the circuit switched network; and a channel count change section changing the number of control channels based on the Q.931 protocol connected by the prior connection section according to an input channel count change request.

5. A gateway apparatus according to claim 4, further comprising an input device for inputting the channel count change request.

6. A gateway apparatus according to claim 4, wherein the channel count change request is input from the circuit switched network.

7. A gateway apparatus, arranged between a circuit switched network and the Internet, executing a connection procedure of a control channel based on a Q.931 protocol, a connection procedure of a control channel based on an H.245 protocol and a connection procedure of a sound channel in order to set a connection on the Internet comprising:

a prior connection section executing the connection procedure of the control channel based on the Q.931 protocol before a call setting request is received from the circuit switched network;

a call setting section setting the connection corresponding to the call setting request on the Internet by using the control channel based on the Q.931 protocol set by the prior connection section when the call setting request is received from the circuit switched network; and a channel count change section respectively changing the number of control channels based on the Q.931 protocol and the number of control channels based on the H.245 protocol connected by the prior connection section according to an input channel count change request, wherein the connection procedure of the control channel based on the H.245 protocol is executed by the prior connection section before the call setting request is received from the circuit switched network, and when the call setting request is received from the circuit switched network, the call setting section sets the connection corresponding to the call setting request on the Internet by using the control channel based on the Q.931 protocol and the control channel based on the H.245 protocol set by the prior connection section.

8. A gateway apparatus, arranged between a circuit switched network and the Internet, executing a connection procedure of a control channel based on a Q.931 protocol, a connection procedure of a control channel based on an H.245 protocol and a connection procedure of a sound channel in order to set a connection on the Internet comprising:

a prior connection section executing the connection procedure of the control channel based on the Q.931 protocol before a call setting request is received from the circuit switched network;

a call setting section setting the connection corresponding to the call setting request on the Internet by using the control channel based on the Q.931 protocol set by the prior connection section when the call setting request is received from the circuit switched network; and a channel count change section respectively changing the number of control channels based on the Q.931 protocol, the number of control channels based on the H.245 protocol, and the number of sound channels connected by the prior connection section according to an input channel count change request, wherein the connection procedure of the control channel based on the H.245 protocol is executed by the prior connection section before the call setting request is received from the circuit switched network, and when the call setting request is received from the circuit switched network, the call setting section sets the connection corresponding to the call setting request on the Internet by using the control channel based on the Q.931 protocol and the control channel based on the H.245 protocol set by the prior connection section, and wherein the prior connection section executes a connection procedure of the sound channel before the call setting request is received from the circuit switched network, and when the call setting request is received from the circuit switched network, the call setting section sets the connection corresponding to the call setting request on the Internet by using the control channel based on the Q.931 protocol, the control channel based on the H.245 protocol and the sound channel set by the prior connection section.

9. A call setting method of a gateway apparatus, arranged between a circuit switched network and the Internet, executing a connection procedure of a control channel based on a Q.931 protocol, a connection procedure of a control channel based on an H.245 protocol, and a connection procedure of a sound channel in order to set a connection on the Internet, comprising the steps of:

executing the connection procedure of the control channel based on the Q.931 protocol before a call setting request is received from the circuit switched network;

setting the connection corresponding to the call setting request on the Internet by using the control channel based on the Q.931 protocol set in the executing step when the call setting request is received from the circuit switched network;

monitoring traffic volume in the gateway apparatus; and changing the number of control channels based on the Q.931 protocol connected by the executing step according to a monitored result of the monitoring step.

10. A call setting method of a gateway apparatus according to claim 9, wherein the executing step executes the connection procedure of the control channel based on the H.245 protocol before the call setting request is received from the circuit switched network, and when the call setting request is received from the circuit switched network, the setting step sets the connection corresponding to the call setting request on the Internet by using the control channel based on the Q.931 protocol and the control channel based on the H.245 protocol set in the executing step.

11. A call setting method of a gateway apparatus according to claim 10, wherein the executing step executes a connection procedure of the sound channel before the call setting request is received from the circuit switched network, and when the call setting request is received from the circuit switched network, the setting step sets the connection corresponding to the call setting request on the Internet by using the control channel based on the Q.931 protocol, the control channel based on the H.245 protocol and the sound channel set by the executing step.

12. A call setting method of a gateway apparatus, arranged between a circuit switched network and the Internet, executing a connection procedure of a control channel based on a Q.931 protocol, a connection procedure of a control channel based on an H.245 protocol and a connection procedure of a sound channel in order to set a connection on the Internet comprising the steps of:

executing the connection procedure of the control channel based on the Q.931 protocol before a call setting request is received from the circuit switched network;

setting the connection corresponding to the call setting request on the Internet by using the control channel based on the Q.931 protocol set by the executing step when the call setting request is received from the circuit switched network; and changing the number of control channels based on the Q.931 protocol connected by the executing step according to an input channel count change request.

13. A call setting method of claim 12, wherein the changing step includes changing the number of control channels based on the Q.931 protocol and the number of control channels based on the H.245 protocol connected by the executing step according to an input channel count change request, and wherein the connection procedure of the control channel based on the H.245 protocol is executed by the executing step before the call setting request is received from the circuit switched network, and when the call setting request is received from the circuit switched network, the setting step sets the connection corresponding to the call setting request on the Internet by using the control channel based on the Q.931 protocol and the control channel based on the H.245 protocol set by the executing step.

14. A call setting method of claim 12, wherein the changing step includes changing the number of control channels based on the Q.931 protocol, the number of control channels based on the H.245 protocol, and the number of sound channels connected by the executing step according to an input channel count change request, and wherein the connection procedure of the control channel based on the H.245 protocol is executed by the executing step before the call setting request is received from the circuit switched network, and when the call setting request is received from the circuit switched network, the setting step sets the connection corresponding to the call setting request on the Internet by using the control channel based on the Q.931 protocol and the control channel based on the H.245 protocol set by the executing step, and wherein the executing step executes a connection procedure of the sound channel before the call setting request is received from the circuit switched network, and when the call setting request is received from the circuit switched network, the setting step sets the connection corresponding to the call setting request on the Internet by using the control channel based on the Q.931 protocol, the control channel based on the H.245 protocol and the sound channel set by the executing step.

* * * * *